United States Patent

Inose et al.

[11] Patent Number: 5,963,713
[45] Date of Patent: *Oct. 5, 1999

[54] PRINTER USING DIRECT MEMORY ACCESS AND REFRESHING

[75] Inventors: Shigeru Inose, Sowamachi; Fumio Miyahara, Sagamihara; Hideaki Kishida, Kawasaki; Yasuhiro Hamada, Yokohama, all of Japan

[73] Assignee: Canon Aptex Inc., Mitsukaido, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/552,110

[22] Filed: Nov. 2, 1995

[30] Foreign Application Priority Data

| Nov. 7, 1994 | [JP] | Japan | 6-272426 |
| Nov. 7, 1994 | [JP] | Japan | 6-272429 |
| Nov. 7, 1994 | [JP] | Japan | 6-272430 |

[51] Int. Cl.[6] .......................... G06F 15/00; B41B 15/00; B41J 15/00
[52] U.S. Cl. ............................. 395/104; 395/115
[58] Field of Search .................. 395/104, 109, 395/115–116, 114, 101, 507–509; 364/246.91, 967.4, 967; 711/106, 111, 112, 148, 155

[56] References Cited

U.S. PATENT DOCUMENTS

| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,688,190 | 8/1987 | Bechtolsheim | 364/900 |
| 4,723,129 | 2/1988 | Endo et al. | 347/56 |
| 4,740,796 | 4/1988 | Endo et al. | 347/56 |
| 5,043,748 | 8/1991 | Katayama et al. | 347/14 |
| 5,173,717 | 12/1992 | Kishida et al. | 347/13 |
| 5,323,488 | 6/1994 | Udagawa | 395/115 |
| 5,353,051 | 10/1994 | Katayama et al. | 347/13 |
| 5,355,441 | 10/1994 | Kawai et al. | 395/115 |
| 5,410,641 | 4/1995 | Wakabayashi et al. | 395/115 |
| 5,530,792 | 6/1996 | Ikeda et al. | 395/115 |

FOREIGN PATENT DOCUMENTS

| 0310217 | 4/1989 | European Pat. Off. . |
| 0311111 | 4/1989 | European Pat. Off. . |
| 0449313 | 10/1991 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 2164770 | 3/1986 | United Kingdom . |

Primary Examiner—Dwayne D. Bost
Assistant Examiner—Tracy M. Legree
Attorney, Agent, or Firm—Fitzpatrick, Cella Harper & Scinto

[57] ABSTRACT

In a color printer, in order to perform a high-speed print operation and ensure a refresh operation and the like of an image memory, print images which correspond to a plurality of printheads, and are bitmapped and stored in a bitmap RAM in units of colors are consecutively read out and DMA-transferred by 16 bits at a time when a read operation is designated. After this DMA operation, the refresh operation of the bitmap RAM or access to the RAM is permitted. The printer includes the same number of latch circuits as that of printheads (e.g., four). Each latch circuit stores a data transfer start address (TOPA) and a data transfer end address (ENDA) in the bitmap RAM. With this arrangement, image data can be efficiently read out. If the capacity of the bitmap RAM is small, an upper address bit in the bitmap RAM is shifted to switch discontinuous addresses to continuous addresses on the bitmap memory side. If an optional memory is implemented, the normal addressing is restored to flexibly cope with a change in the capacity of the image memory.

52 Claims, 15 Drawing Sheets

PRINTER USING DIRECT MEMORY ACCESS AND REFRESHING

BACKGROUND OF THE INVENTION

This invention relates to a printer and, more particularly, to a printer for printing an image on a recording medium by using a line-type printhead.

As a typical conventional ink-jet printer, a serial printer is available, which is designed to sequentially print images by moving the printhead laterally with respect to a conveying direction of a printing paper. As a printer using a line-type printhead having heating elements corresponding to one line, a thermosensitive-transfer printer using a thermal head or the like is well-known.

Such a printer is generally constituted by a formatter for bitmapping PDL data sent from a host computer into an image to be actually printed, a mechanical portion of the printer, and an engine for controlling the mechanical portion.

According to the above arrangement, a small-capacity memory can be used as an image memory (bitmap memory) for storing bitmapped data in a printer for printing an image on a label or card. However, a large-capacity memory is required in a printer for printing an image on a large label or performing a print operation by double buffer print control. In general, the basic arrangements of the above two types of printers are the same except that the image memories have different capacities. For this reason, if the capacity of an image memory is set to be small to limit the application of a printer, a print operation cannot be performed for a large label. In contrast to this, if a large-capacity image memory is integrated in a printer which is used to print an image only on a small label, some memory area becomes an unused memory area, wasting the expensive memory.

In general, in the above formatter, when image data is to be read out from the image memory storing a print image and sent to the engine to be printed, read control of image data is an important factor to increase the print efficiency.

In a color printer or the like having a plurality of line-type printheads, in particular, the image memory is divided into a plurality of areas in correspondence with the respective printheads, and the read address of print data to be transferred to each printhead is switched and output for each page. Such an address switching timing must be changed in accordance with the length of printing paper, the intervals of the printheads, and the like. It is very difficult to perform read control in consideration of all these conditions.

In the ink-jet printer using the above line-type printheads, when, for example, images of different colors are to be printed in units of lines by using the printheads for Y, M, C, and K (having about 1,400 printing elements; 1 element=1 dot), the total amount of print data to be transmitted from the formatter to the respective printheads to print one line corresponds to four lines (about 5,600 dots=700 bytes (in the case of binary data)). That is, this printer needs a higher data transfer rate than a conventional monochrome line printer. In addition, the time required to read out data from the bitmap memory storing such print data must be shortened. Furthermore, such a bitmap memory needs to have a large capacity to store print data for the four colors. In order to reduce the memory cost, a DRAM requiring a refresh operation is generally used.

In reading out print data from such a large-capacity bitmap memory, therefore, a DMA (Direct Memory Access) transfer method is usually employed in order to shorten the time required to read out data, and the refresh operation of the memory must be ensured. Since an increase in print speed is required, the time required to read out print data is limited. If a high-speed full color print operation is performed under this condition, the time required for DMA transfer prolongs with an increase in the amount of data. This might result in a failure of a refresh operation and a destruction of the contents stored in the memory. If priority is given to the refresh operation of the memory, print data may not be transferred in time.

SUMMARY OF THE INVENTION

Accordingly, it is an object of the present invention to provide a printer capable of performing a high-speed print operation while ensuring the refresh operation and the like of an image memory.

It is another object of the present invention to provide a printer capable of performing a high-speed print operation by reading out data from an image memory storing a large amount of print image data and sending the data to a print unit by a DMA method.

According to one aspect of the present invention, the foregoing object is attained by providing a printer for receiving print data from an external device and printing an image on a recording medium by using a plurality of printheads, comprising: storage means for bitmapping the print data into print images and storing the images in units of colors; print means for receiving the print images and outputting the images to the plurality of printheads to print the images on the recording medium; read means for consecutively reading out the print image corresponding to each of the plurality of printheads from the storage means by a predetermined amount using a direct memory access method when a read operation for the print images stored in the storage means is designated by the print means; and access means for refreshing or accessing the storage means after the read operation is completed by the read means, wherein the predetermined amount is a data amount which ensures a refresh interval required by said storage means.

In accordance with this aspect of the present invention as described above, print data is bitmapped into print images and stored in the storage means in units of colors. When a read operation for the print images stored in the storage means is designated by the print means for receiving the print images and printing the images on the recording medium by outputting the images to the printheads, each of the print images corresponding to the plurality of printheads is continuously read out from the storage means by a predetermined amount according to the DMA method. When this read operation based on the DMA method is completed, the refresh operation for the storage means or access thereto is performed.

It is still another object of the present invention to provide a printer capable of efficiently reading out print image data from a memory which stores the print image data, and printing an image.

It is still another object of the present invention to provide a printer capable of reading out print image data from a memory regardless of a size of a recording medium, and transferring the print image data to a plurality of printheads in accordance with the print timings of the printheads to print an image.

According to another aspect of the present invention, the foregoing object is attained by providing a printer for receiving print data from an external device and printing an image on a recording medium by using a plurality of printheads, comprising: storage means for bitmapping the print data into print image data and storing the data in correspondence with the plurality of printheads; print means for receiving the print image data from the storage means and printing the data on the recording medium by outputting the data to the plurality of printheads; address storage means for storing read start and end addresses of each of the print image data stored in correspondence with the plurality of printheads; and transfer means for reading out the print image data from addresses, in the storage means, which are between the read start and end addresses stored in the address storage means, and transferring the data to the corresponding printheads.

In accordance with this aspect of the present invention as described above, print data is bitmapped into print image data, and the data are stored in the memory in correspondence with each of the plurality of printheads. The print means receives the print image data from the memory and outputs the data to the plurality of printheads to print images on the recording medium. The read start and end addresses, in the memory, which correspond to the print image data stored in correspondence with each of the plurality of printheads are stored. Print image data are read out from addresses, in the memory, which correspond to the addresses between the stored read start and end addresses, and are transferred to the corresponding printheads, thereby performing a print operation.

It is still another object of the present invention to provide a printer capable of changing the capacity of an image memory which stores print images in accordance with the application of the printer.

It is still another object of the present invention to provide a printer capable of changing the capacity of an image memory.

It is still another object of the present invention to provide a printer capable of accessing a print image with the same memory address regardless of whether a memory is added or not.

According to still another aspect of the present invention, the foregoing object is attained by providing a printer for receiving print data from an external device and printing an image on a recording medium by using a plurality of printheads, comprising: storage means for bitmapping the print data into print image data and storing the data in correspondence with the plurality of printheads; print means for receiving the print image data from the storage means and printing the data on the recording medium by outputting the data to the plurality of printheads; signal generation means for generating an optional memory signal indicating that an optional memory is added to the storage means; and address changing means for changing an address for accessing the storage means in accordance with the optional memory signal.

In accordance with this aspect of the present invention as described above, print data is bitmapped into print image data, and the data are stored in the memory in accordance with each of the plurality of printheads. The print image data is input from the memory and output to the plurality of printheads to print images on the recording medium. The address for accessing the memory is changed in accordance with an optional memory signal indicating that an optional memory is added to the memory.

The invention is particularly advantageous since a high-speed print operation can be performed while the refresh operation and the like of the image memory can be ensured, and a high-speed print operation can be performed by reading out data from the image memory which stores a large amount of print image data, and transferring the data to the print unit by the DMA method.

In addition, image data can be efficiently read out from the memory which stores print image data, and print image data can be efficiently read out from the memory regardless of a size of a recording medium. Furthermore, the above read print image data can be transferred to the plurality of printheads to be printed in accordance with the print timings of the printheads.

Moreover, the capacity of an image memory for storing print image can be changed in accordance with the use of the printer, and print image can be accessed with the same memory address regardless of whether another memory is added or not.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail below with reference to the accompanying drawings.

[First Embodiment]

Figure 1:
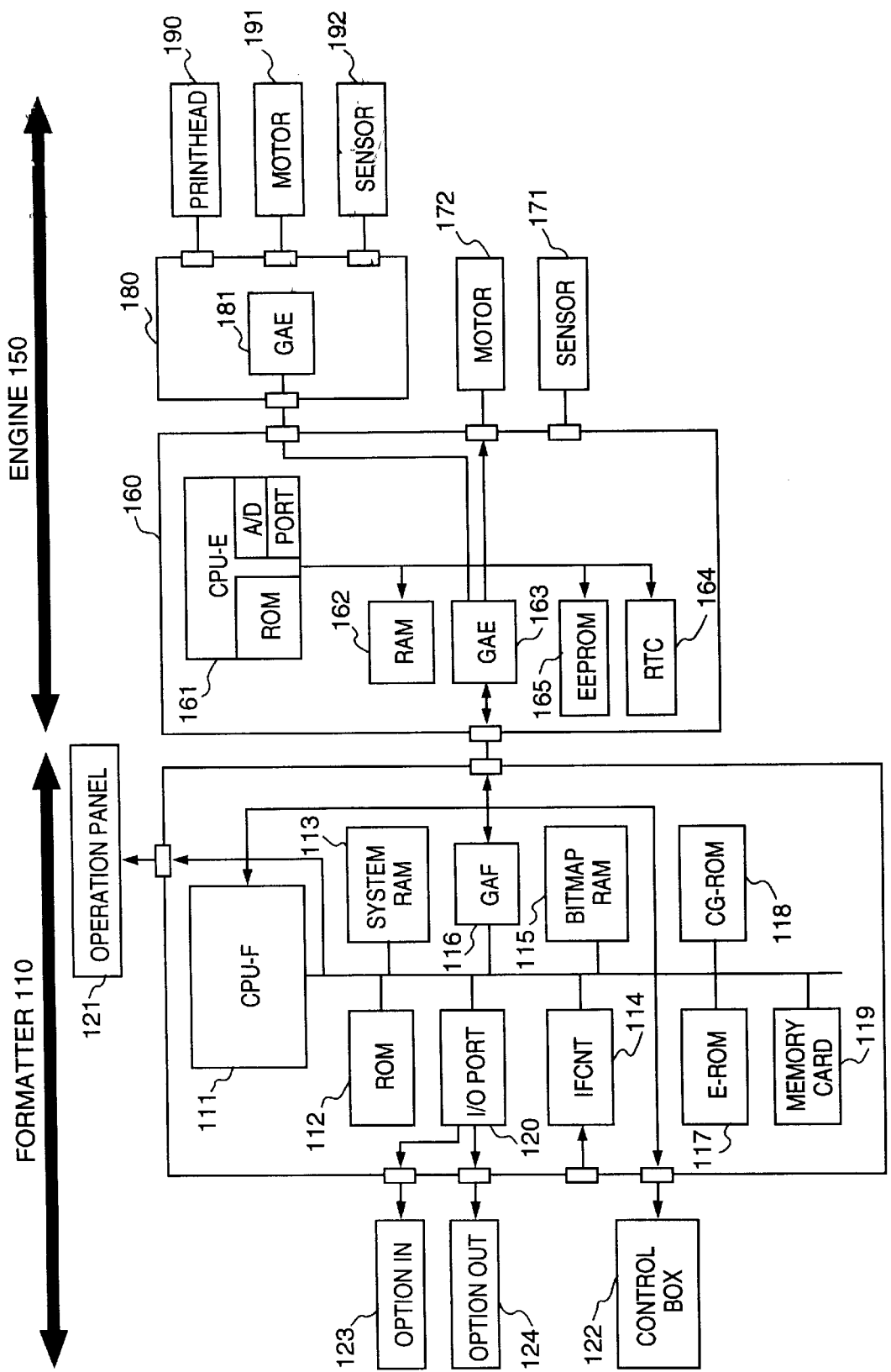
FIG. 1 is a block diagram showing the circuit arrangement of a color printer having full-line printheads based on an ink-jet method according to a typical embodiment of the present invention.

FIG. 1 is a block diagram showing the circuit arrangement of a color printer (to be referred to as a printer hereinafter) having full-line printheads based on the ink-jet printing method according to a first embodiment of the present invention. As shown in FIG. 1, the circuit of this printer is constituted by a formatter 110 for controlling communication with a host computer (to be referred to as a host hereinafter) and bitmapping data into a bitmap RAM, and an engine 150 for performing various control operations for the printheads and controlling a convey motor and various sensors.

This arrangement is designed for the following purpose. The formatter 110 requires a circuit arrangement corresponding to various applications (e.g., a facsimile apparatus and a copying machine as well as a printer) in consideration of different interfaces with the host and different image processing methods. In contrast to this, the engine 150 is designed to reduce differences dependent on applications, and is standardized to cope with any applications, thereby attaining a reduction in cost.

In this embodiment, the following functions are assigned to the formatter 110 and the engine 150.

(1) Functions of Formatter interfacing with the host analyzing a command sent from the host bitmapping print data into the bitmap RAM on the basis of the command control of an operation panel control of a control box (to be described later)

interfacing with the engine 150 option control: control (option IN) of a printing paper supply unit, and control (operation OUT) of printing paper discharge unit (2) Functions of Engine interfacing with the formatter 110 control of an ink supply subsystem control of a paper convey subsystem data transfer control for each printhead heater on/off control of each printhead temperature management timepiece function backup memory function printing paper width detection function In order to realize these functions, the following circuit arrangement is required.

Referring to FIG. 1, the formatter 110 is constituted by a CPU-F 111 for executing control programs, a ROM 112 for storing the control programs, a system RAM 113 for executing programs, an IFCNT 114 for communication with the host, a bit map RAM 115 for storing the bitmap data of print contents transmitted from the host, a circuit GAF 116 dedicated for controlling the bit map RAM 115 and performing communication with the engine 150, an emulation ROM (E-ROM) 117 for analyzing print data from the host, a character generator (CG-ROM) 118 for converting character code data into bitmap data, a memory card 119 used as an external memory, an I/O port 120 serving as an interface with the above option control functions, and an operation panel 121 serving as a user interface and including keys for various operations, an LCD for displaying a message from the printer, and the like.

Reference numeral 122 denotes a control box which serves as a user interface to perform various instruction input operations when this printer performs an image print operation by using image data stored in the memory card 119 in a stand-alone manner without being connected to the host; and 123 and 124, input/output interfaces (an option IN and an option OUT) with various apparatuses to be connected, as options, to the printer. In this embodiment, the printing paper supply unit (to be described later) is connected to the option IN 123, and the printing paper discharge unit (to be described later) is connected to the option OUT 124.

The engine 150 will be described next.

As shown in FIG. 1, the engine 150 is constituted by an engine circuit 160 mainly designed for a printing paper conveying operation, and an engine circuit 180 mainly designed for printhead driving control.

The engine 150 is constituted by a CPU-E 161 including a ROM for storing control programs, a RAM used as a work area to execute the programs, a port for receiving a signal from a sensor (to be described later), and an A/D converter for converting an analog input from the port into digital data, and adapted to execute the control programs to perform various control operations, a RAM 162 used when the CPU-E 161 executes a program, an EEPROM 163 for storing unevenness correction data for each printhead, a clock counter (RTC) 164, and a GAE 165 dedicated for generating test print data and performing communication with the formatter 110. Reference numeral 171 denotes a sensor for detecting the position of printing paper; and 172, a convey motor for conveying the printing paper.

The engine circuit 180 includes a circuit GAE 181 dedicated for driving/controlling a printhead 190, controlling a motor 191 for moving the printhead 190 and a cap (not shown) to cap the ink discharge nozzles of the printhead 190 when no print operation is performed, and controlling a sensor 192 for detecting the positions of the cap and the printhead.

Figure 2:
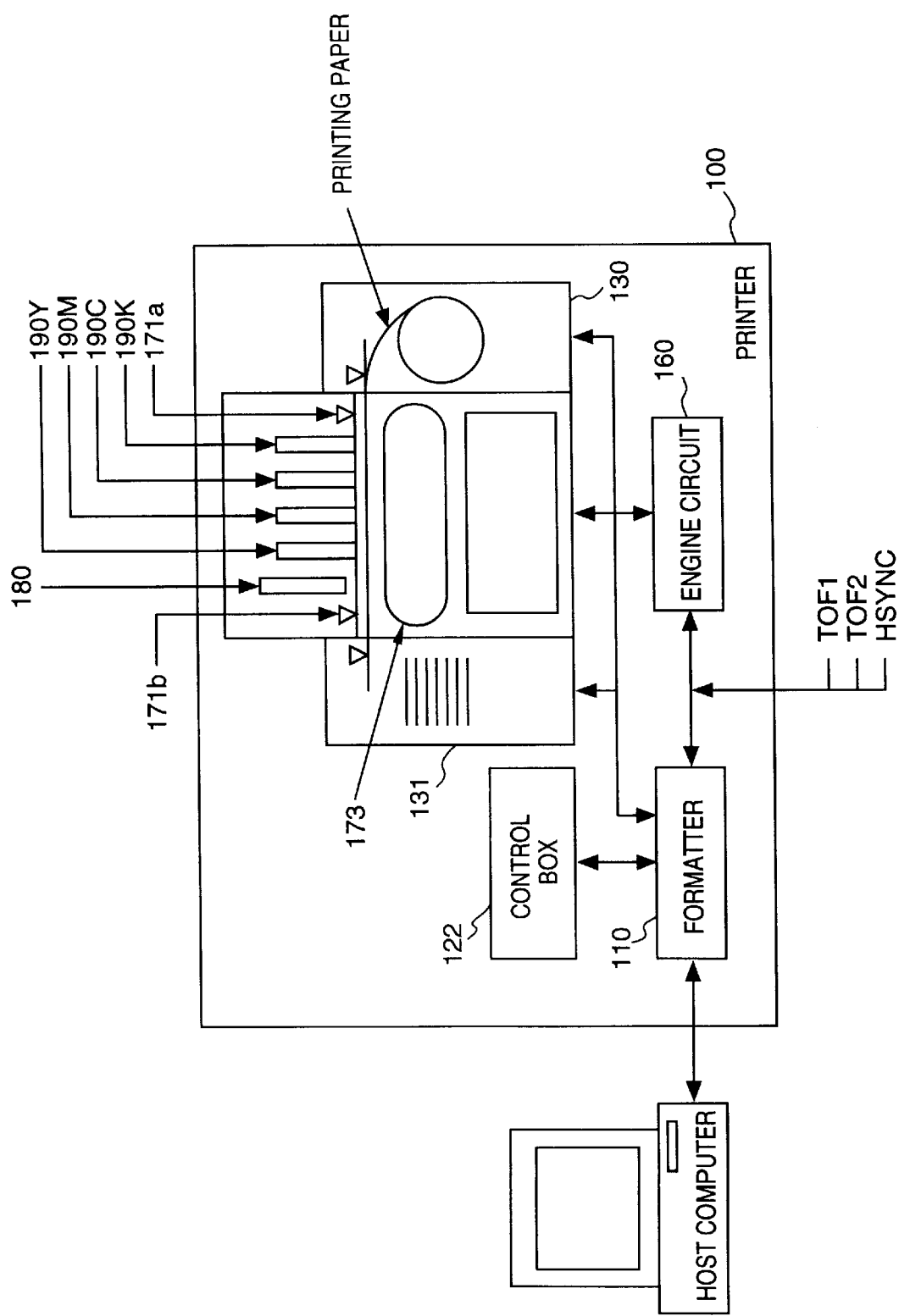
FIG. 2 is a sectional side view showing the schematic arrangement of the printer in FIG. 1.

FIG. 2 is a sectional side view showing the schematic arrangement of a printer 100 described above with reference to FIG. 1. FIG. 2 shows the printer 100 incorporating the control box 122, a printing paper supply unit 130 using roll paper as printing paper, and a printing paper discharge unit 131 having a cutter for cutting the roll paper after a print operation. The engine 150 is divided into these two parts 160 and 180 for easy implementation upon mounting on the printer, as shown in FIG. 2.

Reference numeral 190Y denotes a full-line printhead (Y head) for performing printing by using yellow (Y) ink; 190M, a full-line printhead (M head) for performing printing by using magenta (M) ink; 190C, a full-line printhead (C head) for performing printing by using cyan (C) ink; and 190K, a full-line printhead (K head) for performing printing by using black (K) ink. These printheads are arranged along the convey direction of printing paper.

Reference numeral 171a denotes a sensor for detecting the leading portion of the printing paper from black lines printed on the roll paper at predetermined equal intervals and generating a signal (TOF1); 171b, a sensor for detecting the leading portion of the printing paper from a black line printed on the roll paper after a print operation, and generating another signal (TOF2); and 173, a convey belt which is rotated/driven upon rotation of the convey motor 172. When the convey belt 173 is moved, the printing paper (recording medium) placed on the convey belt 173 is conveyed.

[Description of Operation of Formatter 110]

The main functions of the formatter 110 are to receive print data from the host computer, analyze the data, bitmap the data into a bitmap RAM 115, and communicate with the engine 150.

There are many technical references concerning reception, analysis, and bitmapping of print data from the host computer. That is, these techniques are well known techniques. A GAF 116 for controlling the bitmap RAM, which serves an interface unit for the engine 150, will be mainly described below.

Figure 3:
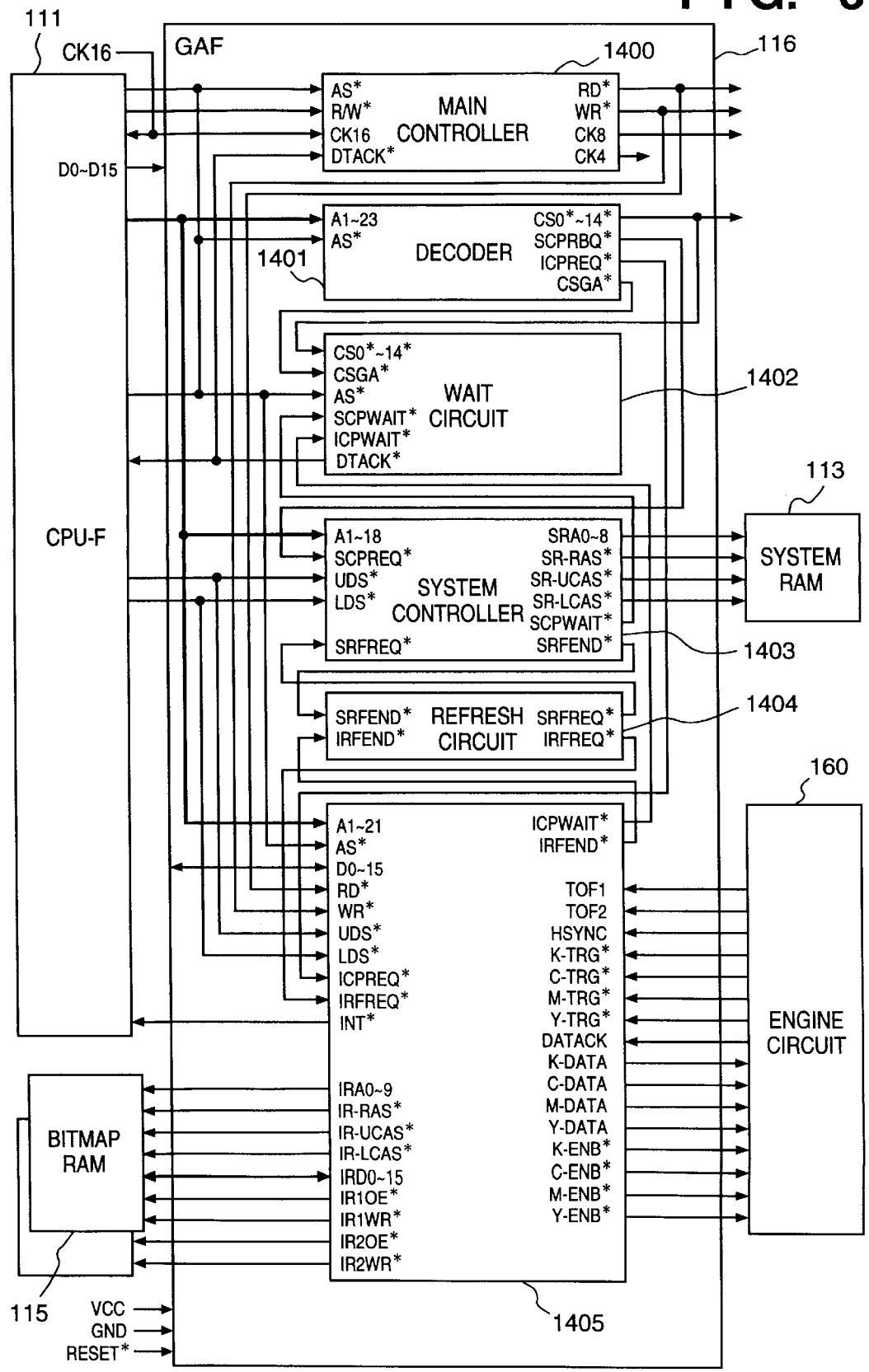
FIG. 3 is a block diagram showing the arrangement of a GAF 116 of a formatter 110.

FIG. 3 is a block diagram showing the internal arrangement of the GAF 116.

The main functions of the GAF 116 are a function of controlling a system RAM 113 (system controller 1403), a DRAM refresh control function (refresh circuit 1404), and an engine control function (engine control unit 1405). Of these functions, the control function for the engine control unit 1405, which is a characteristic feature of this embodiment, will be described below.

Figure 4:
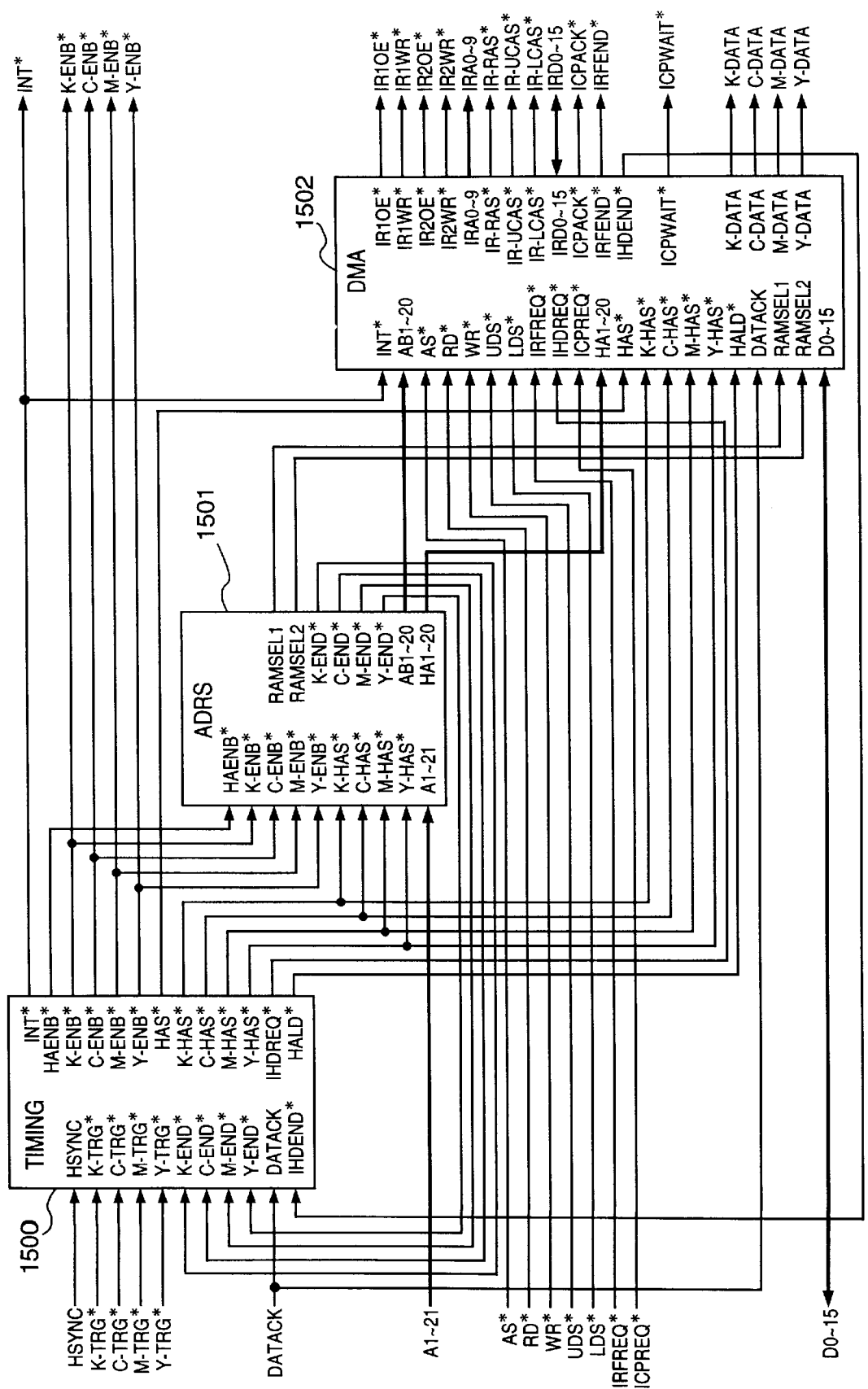
FIG. 4 is a block diagram showing the arrangement of an engine control unit 1405 of the GAF 116.

FIG. 4 is a block diagram showing the arrangement of the engine control unit 1405.

As shown in FIG. 4, the engine control unit 1405 is constituted by three circuit blocks. The first block is a timing (TIMING) block 1500 for producing a reference timing for data transfer. The second block is an ADRS block 1501 for generating an address for reading out data to be transferred to the engine 150 by read-accessing the bitmap RAM 115. The third block is a DMA block 1502 serving as an interface with the bitmap RAM 115.

The operation of the timing block 1500 will be described first.

Figure 5:
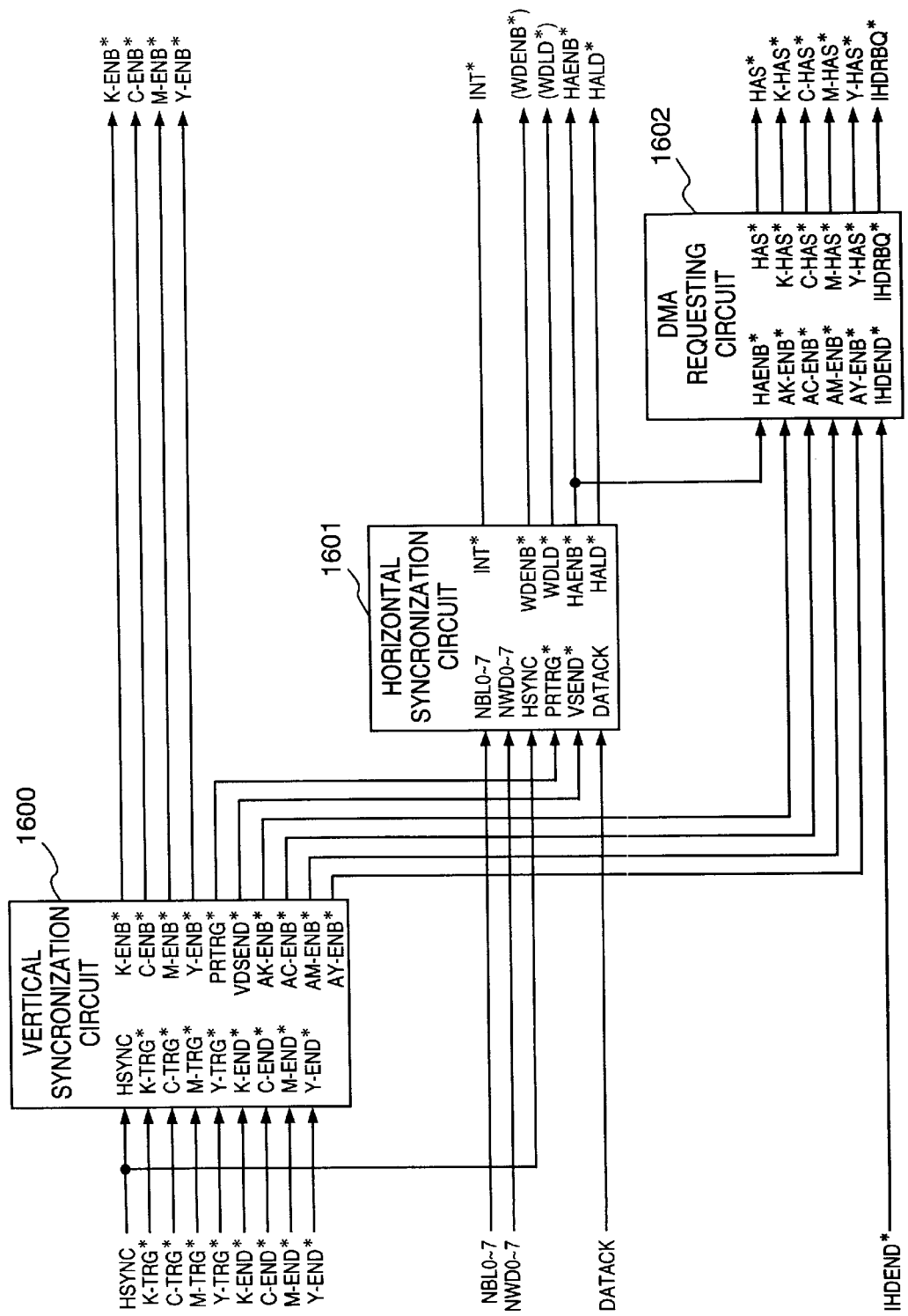
FIG. 5 is a block diagram showing the arrangement of a timing block 1500 of an engine control unit 1405.
Figure 6:
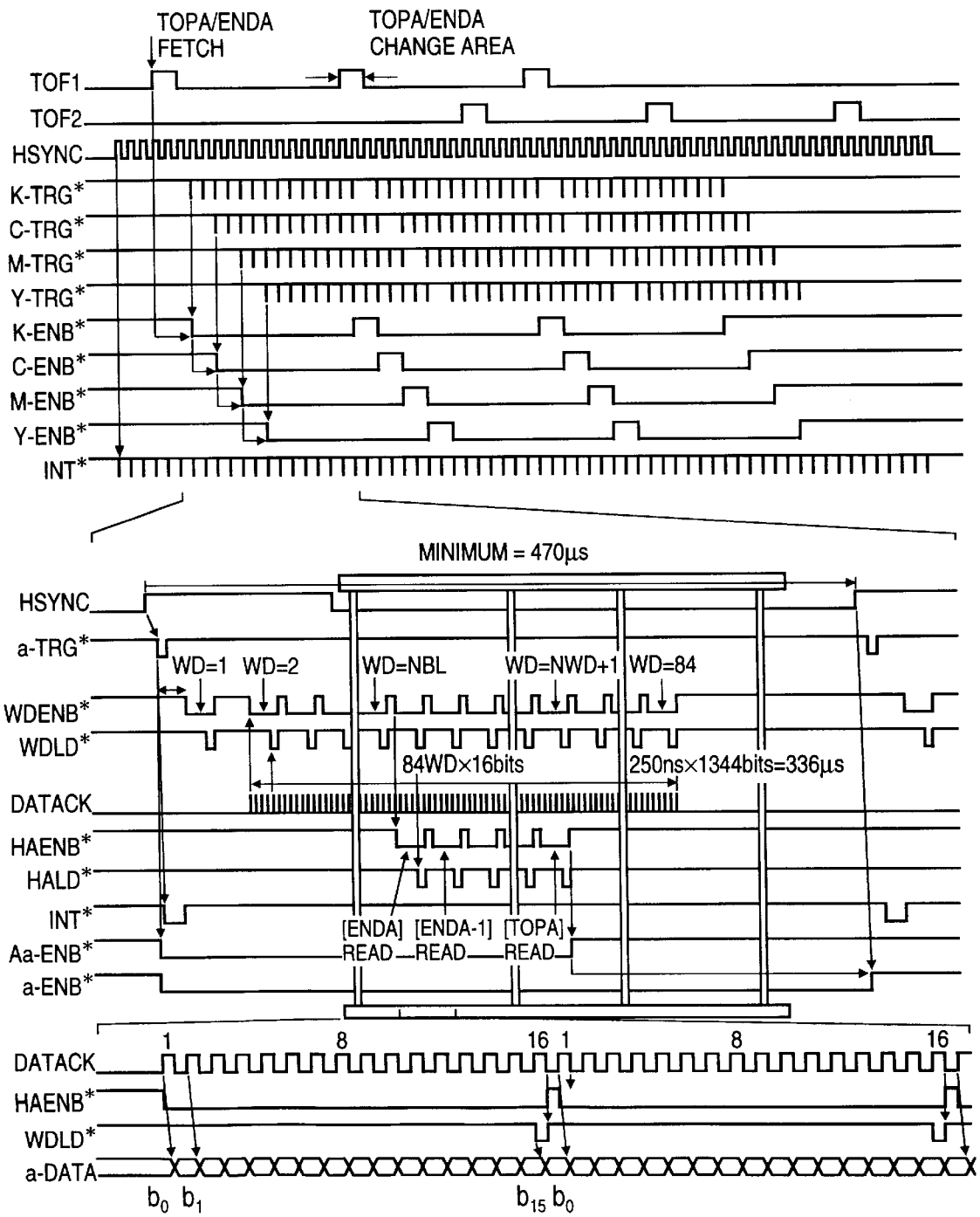
FIG. 6 is a timing chart showing an operation sequence in the timing block 1500.

FIG. 5 is a block diagram showing the arrangement of the timing block 1500. FIG. 6 is a timing chart showing an operation sequence in the timing block 1500.

The timing block 1500 is constituted by a vertical synchronization circuit 1600, a horizontal synchronization circuit 1601, and a DMA requesting circuit 1602.

(1) Vertical Synchronization Circuit 1600

The vertical synchronization circuit 1600 generates signals a-ENB* and Aa-ENB* from a data transfer request signal a-TRG* sent from the engine circuit 160. The signal Aa-ENB* becomes active (low level) at the trailing edge of the signal a-TRG*, and becomes inactive in accordance with a signal a-END* output from the ADRS block 1501. The signal a-ENB* is inactivated (high level) in synchronism with a signal HSYNC after the signal Aa-ENB* becomes inactive. This is because the signal Aa-ENB* is a signal for requesting data for DMA and operates independently of horizontal synchronization, while the signal a-ENB* represents the print page length and requires horizontal synchronization.

(2) Horizontal Synchronization Circuit 1601

The horizontal synchronization circuit 1601 controls signals NBL and NWD for inputting "0" data to the right and left areas of the printhead which are not used for a print operation. More specifically, after the signal DATACK corresponding to the NBL register value is counted, the horizontal synchronization circuit 1601 makes a signal HAENB* as a DMA request signal for the bitmap RAM 115 active. The signal HAENB* is kept active only for a period corresponding to 16 clocks (16 bits) of the signal DATACK. This operation is repeated by the number of times corresponding to the NWD register value. At this time, the signal HALD* indicating that data of four colors is read out from the bitmap RAM 115 is also output.

Assume that the value of NBL is "0", i.e., a print operation is performed from the nozzle on the right end of the printhead. In this case, when the signal a-TRG* becomes active, data is read out from the bitmap RAM 115 regardless of the signal DATACK. In the engine 150, data is fetched at the leading edge of the signal DATACK, while data transfer is changed at the trailing edge of the signal DATACK. For this reason, when the first signal DATACK is input, it is necessary that the data of bit 0 ($b_0$) be output already.

(3) DMA Requesting Circuit 1602

The DMA requesting circuit 1602 calculates the logical product of the above-described signal Aa-ENB* and the signal HAENB*, and outputs a print data request signal a-HAS* for each color. Note that a signal IHDEND* is a signal indicating that one-word (16-bit) data is read. As described above, since the signal HAENB* is kept active only for a period of time corresponding to 16 clocks, the print data must be completely read within this period of time.

The address (ADRS) block 1501 will be described next.

The ADRS block 1501 is an address generation unit for DMA. The ADRS block 1501 sequentially outputs addresses for the four colors on the basis of the signal HAENB* from the timing block 1500. When DMA transfer for one page data is completed, the ADRS block 1501 outputs the signal a-END* to the timing block 1500.

The DMA block 1502 will be described next.

The DMA block 1502 is a circuit for realizing a bus-arbitration function of controlling access to the bitmap RAM 115, a DRAM control function, and a data transfer function of parallel/serial-converting data from the bitmap RAM 115, which is read by the DRAM control unit, and transferring the data in synchronism with the signal DATACK sent from the engine 150.

With the above operation, the print data is transferred to a printhead 190 to print a high-quality color image.

A DMA block will be described next.

Figure 7:
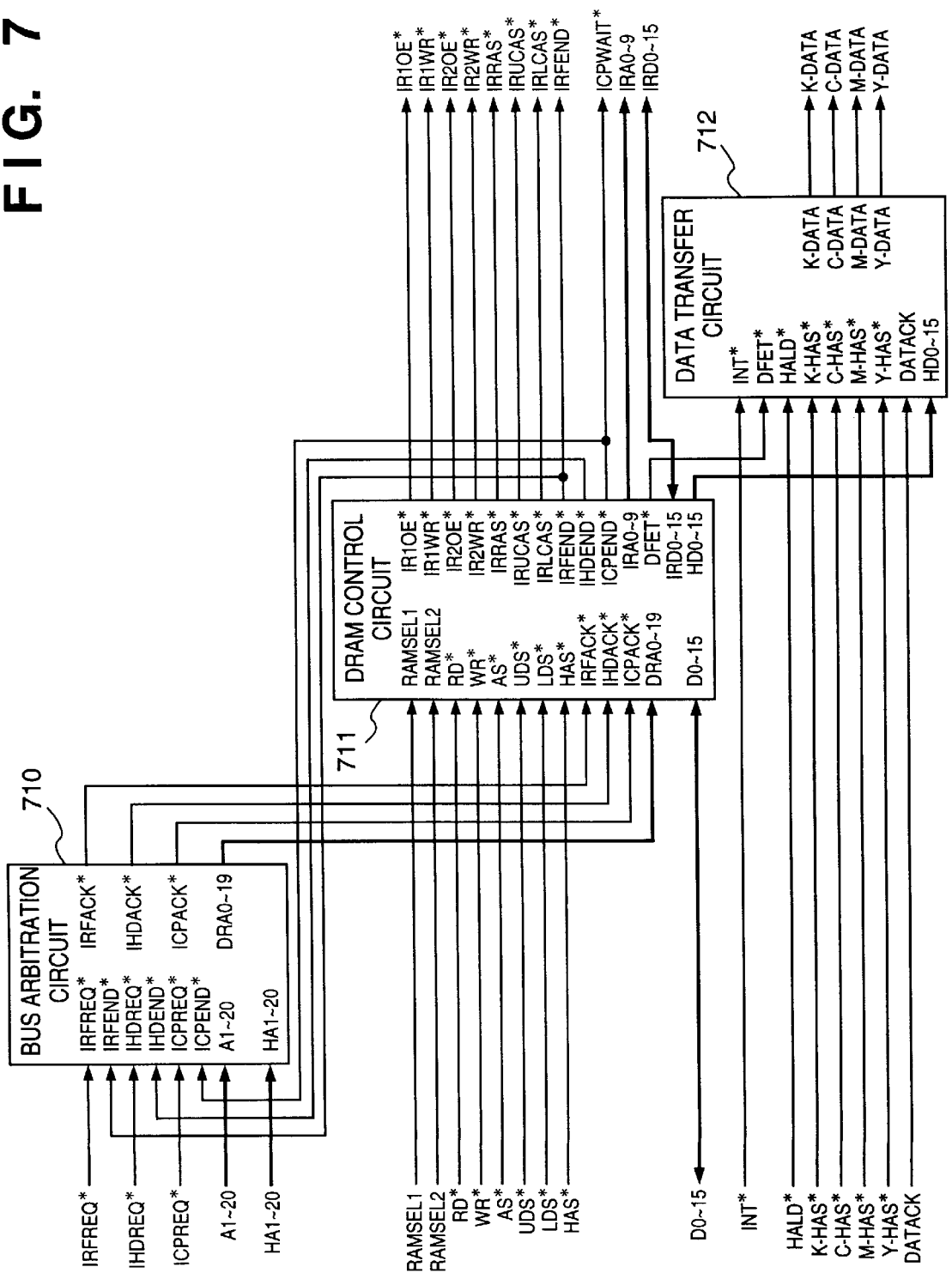
FIG. 7 is a block diagram showing the arrangement of a DMA circuit 1502 of an engine control unit 1405.

FIG. 7 is a block diagram showing the arrangement of a DMA circuit 1502.

As shown in FIG. 7, the DMA circuit 1502 is constituted by a bus arbitration circuit 710, a DRAM control circuit 711, and a data transfer circuit 712.

<Bus Arbitration Circuit 710>

Access to a bitmap RAM 115 includes three types of access operations, i.e., an access operation for a CPU-F 111 in a formatter 110 to read/write data, a read-access operation by a DMA operation, and an access operation for refreshing the bitmap RAM 115. These operations are independent of each other, and hence these three types of access to the bitmap RAM 115 may occur at a time. The bus arbitration circuit 710 therefore performs arbitration among these access operations to sequentially give access rights with respect to the bitmap RAM 115 to the respective units.

<DRAM Control Circuit 711>

The DRAM control circuit 711 is a circuit for generating a control signal for the bitmap RAM 115 (DRAM).

<Data Transfer Circuit 712>

The state of the data transfer circuit 712 is cleared by a signal INT* output in synchronism with a horizontal sync signal (HSYNC). A signal a-HAS* is a signal which is set at low level when 16-bit data of each color is read out and transferred from the bitmap RAM 115 by DMA. A signal DFET* is a latch signal for 16-bit data output from the DRAM control circuit 711.

As described with reference to FIG. 6, the timing at which 16-bit data is transferred from the formatter 110 to an engine 150 is determined by a signal HALD* output after the value of NBL is counted. Before this signal HALD* is output, "0" is transferred as a signal a-DATA.

At the timing at which the signal HALD* is output and print data is transferred, the DRAM control circuit 711 outputs print data as signals HD0 to HD15, and the signals HD0 to HD15 are stored in the data transfer circuit 712 for each color signal in response to the signal DFET*. When the print data for the four colors are stored in the data transfer circuit 712 in this manner, the signal HALD* becomes active, and the 16-bit data is converted into serial data. The serial data is output as the signal a-DATA in synchronism with a signal DATACK transferred from the engine 150. With this operation, the print data is transferred to the engine 150.

The operation of the DMA block has been described.

Figure 8:
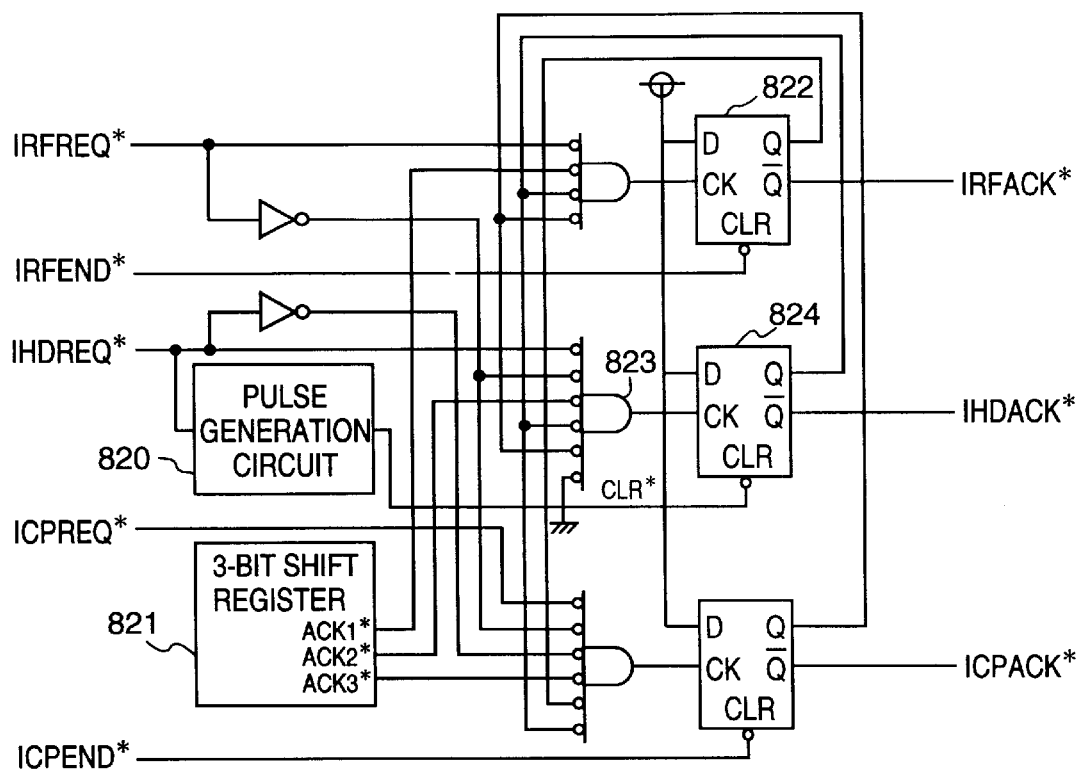
FIG. 8 is a circuit diagram showing the arrangement of a bus arbitration circuit 710 of the DMA circuit 1502.
Figure 9:
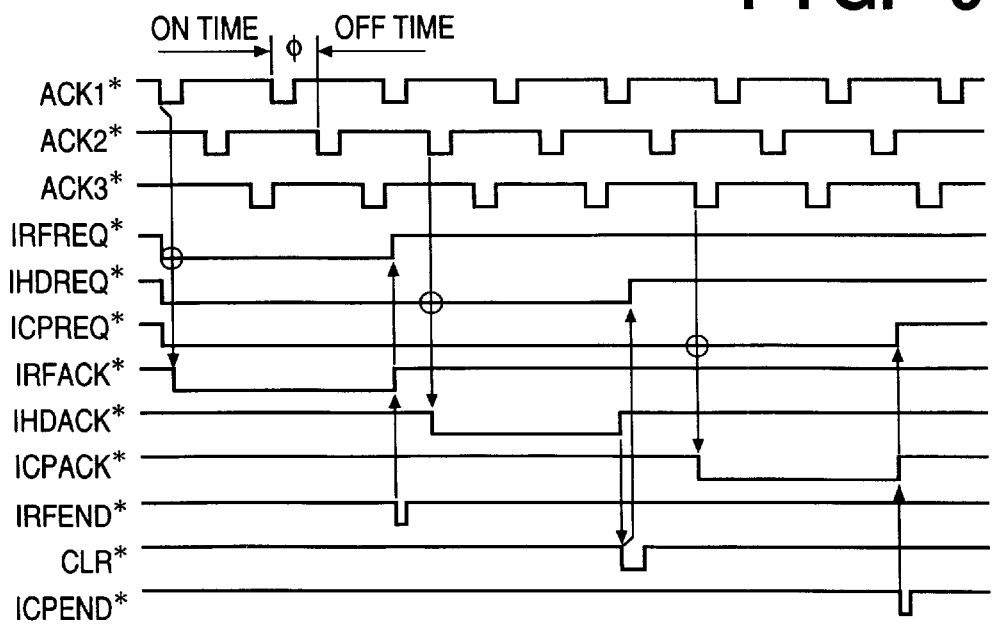
FIG. 9 is a timing chart for showing an operation sequence in the bus arbitration circuit 710 in FIG. 8.

FIG. 8 is a block diagram showing the arrangement of the bus arbitration circuit 710. FIG. 9 is a timing chart showing the operation of the bus arbitration circuit 710.

In the bus arbitration circuit 710, a 3-bit shift register 821 performs a loop operation to generate a signal ACK1* for giving an access right for a refresh operation, a signal ACK2* for giving an access right for a DMA operation, and a signal ACK3* for giving an access right for the operation of the CPU-F 111. The ON time of the 3-bit shift register 821 is an access right input time. The OFF time of the 3-bit shift register 821 is a time for determining an access right. Assume, for example, that a signal IRFREQ* as a refresh operation request signal becomes active (low level) to permit a refresh operation. In this case, a flip-flop 822 is set, and a signal IRFACK* becomes active (low level), and is output. Since the Q output from the flip-flop 822 inhibits other signals from being output from the gate, other signals IHDREQ* and ICPREQ* are rendered inactive. Even if, therefore, the signal IHDREQ* becomes active immediately after the signal IRFREQ* becomes active, the signal IHDREQ* is disabled by a gate 823. Thus, a flip-flop 824 is not set, and the bitmap RAM 115 can properly perform a refresh operation.

If, however, the above signals ACK1 to ACK3 have no OFF time, both the signals IRFACK* and IHDACK*, for example, concurrently becomes active. As a result, the bitmap RAM 115 cannot be properly accessed. For this reason, a time for inhibiting and determining an access right is required. Assume that the signal IRFACK* becomes active to give an access right. In this case, the DRAM control circuit 711 performs an access operation with respect to the DRAM (bitmap RAM 115). When the access operation for a refresh operation is completed, a signal IRFEND* becomes active. The bus arbitration circuit 710 resets the flip-flop 822 by using this signal IRFEND*, renders the signal IRFACK* inactive (high level), and waits for the next access right request signal.

A case wherein three bus access right request signals (IRFREQ*, IHDREQ*, and ICPREQ*) simultaneously becomes active will be described next with reference to FIG. 9.

Assume that the three access right request signals are rendered active when the signal ACK1* of the outputs from the 3-bit shift register 821 is rendered active. In this case, only the signal IRFREQ* is permitted, and the signal IRFACK* becomes active. The remaining two access right request signals are not permitted. With this operation, a refresh operation is performed by the DRAM control circuit 711. When this refresh operation is completed, the signal IRFEND* becomes active, and the signal IRFREQ* is rendered inactive (high level).

Subsequently, since the signal ACK2* of the outputs from the 3-bit shift register 821 becomes active, the signal IHDREQ* is permitted this time to be set in the flip-flop 824, and a signal IHDACK* becomes active (low level). With this operation, a read operation using DMA is performed in the DRAM control circuit 711. When this read operation is completed, the signal IHDREQ* is rendered inactive (high level). As a result, a signal CLR* is output from a pulse generation circuit 820 to the flip-flop 824, and the signal IHDACK* is rendered inactive. Thereafter, the signal ICPREQ* is permitted, and a signal ICPACK* becomes active. With this operation, a read/write operation of the CPU-F 111 is permitted by the DRAM control circuit 711. When this operation is completed, a signal ICPEND* becomes active, and the signal ICPACK* is rendered inactive. The bus arbitration circuit 710 then waits for the next access right request. The reason why the signal IHDREQ* undergoes the operation different from that for remaining two signals will be described later.

As shown in FIG. 8, in the bus arbitration circuit 710, (1) the signals IHDREQ* and ICPREQ* are not output from the corresponding input gates when the signal IRFREQ* becomes active, and (2) the signal ICPREQ* is not output from the corresponding input gate when the signal IHDREQ* becomes active. The reasons for operations (1) and (2) will be described below.

A refresh operation is a mandatory operation for ensuring integrity of the data stored in the bitmap RAM 115. The highest priority for this operation must be, thus, given. The priority for a DMA operation follows the refresh operation. This is because data transfer to the engine 150 cannot be properly performed if the DMA operation is delayed, as described above. An access operation of the CPU-F 111 is of the lowest priority. This is because no improper operation occurs even if this access operation is delayed. The respective signals are therefore masked at the respective input gates on the basis of the priority to perform a proper operation.

Assume that such a gate circuit does not exist. In this case, if the CPU-F 111 continuously accesses the bitmap RAM 115 and the signal ACK3* becomes active after a signal ICP-END* from the CPU-F 111 becomes active, neither refresh operation and nor DMA operation is performed. As a result, the contents of the data in the bitmap RAM 115 might be modified or print data transfer might not be possible.

As described above, a refresh operation and a DMA operation are not consecutively performed. Since a time during which no access is made comes without fail after one access operation is performed, another access can be allowed, thereby allowing proper execution of the three access operations.

A DMA request circuit 1602 of a timing block 1500 in FIG. 5 will be described in detail below.

Figure 10:
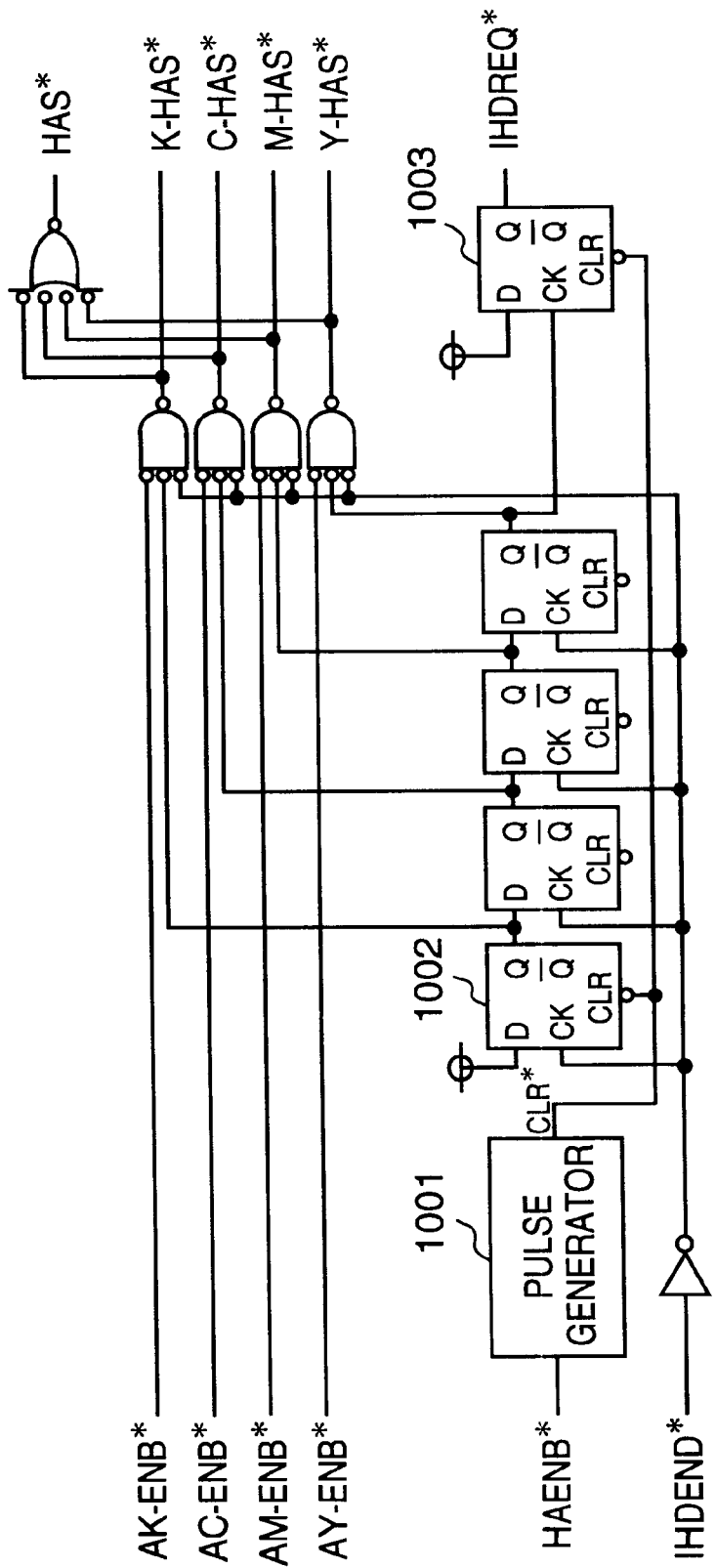
FIG. 10 is a circuit diagram showing the arrangement of a DMA request circuit 1602 of a timing block 1500 of the engine control unit 1405.
Figure 11:
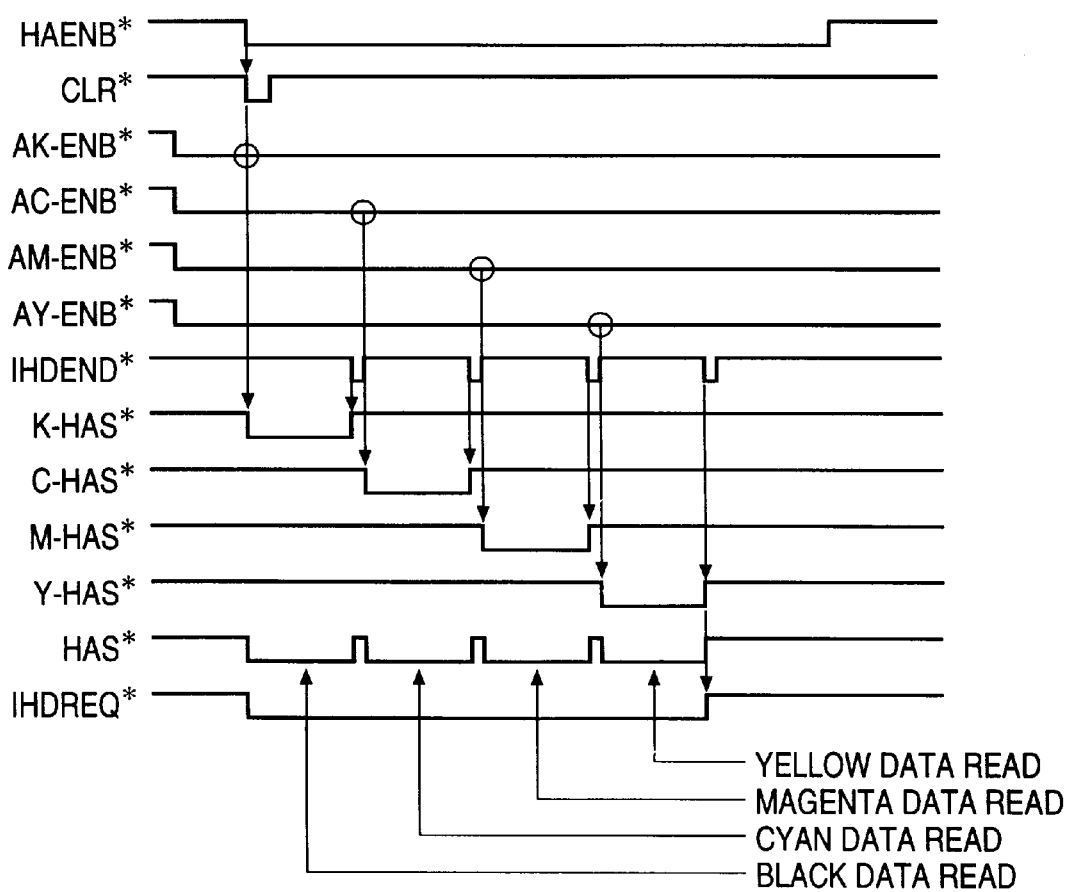
FIG. 11 is a timing chart for showing an operation sequence in the DMA request circuit 1602.

FIG. 10 is a circuit diagram showing the arrangement of the DMA request circuit 1602. FIG. 11 is a timing chart showing an operation sequence in the circuit in FIG. 11.

Referring to FIG. 10, reference numeral 1001 denotes a pulse generator for outputting a clear signal (CLR*) at the trailing edge of a signal HAENB* to clear flip-flops 1002 and 1003. With this operation, both a signal K-HAS* and the signal IHDREQ* becomes active, so that 16-bit black data is read out from the bitmap RAM 115 and temporarily stored in the data transfer circuit 712. When the 16-bit black data is completely read out in this manner, a signal C-HAS* becomes active. As a result, 16-bit cyan data is read out and stored in the data transfer circuit 712 as in the case of the black data. When magenta and yellow data are sequentially read out in the same manner and the 16-bit data for the four colors are stored in the data transfer circuit 712, the signal IHDREQ* is set at high level, and the data transfer request for one transfer operation (16-bit data for each color) using DMA to the printhead 190 is disabled.

In the data transfer circuit 712, as shown in FIG. 6, the signal HALD* becomes active, and each read 16-bit data is latched by a parallel-serial converter for each color, and the print data for the four colors are simultaneously transferred in synchronism with a signal DATACK sent from the engine 150.

A signal IHDREQ* for requesting data transfer is a signal for requesting print data for the four colors from the bitmap RAM 115 to DMA-transfer the print data to the printhead 190 in synchronism with the signal HAENB*.

As described above, the GAF 116 includes the bus arbitration circuit 710 for arbitrating the three access rights. A DMA access is limited in terms of time because this access is executed in synchronism with the signal DATACK from the engine circuit 160. Assume that the frequency of the signal DATACK is 4 MHz. In this case, in order to transfer data corresponding to one word (16 bits) as the minimum transfer unit, the DMA-transfer for the four colors must be completed within a time corresponding to 16 clocks, i.e., 4 μsec. Assume that the access time (TD) for one DMA operation is 400 nsec, the access time (TC) by the CPU-F 111 is 400 nsec, the refresh access time (TR) is 200 nsec, and the bus arbitration time (TB) is 100 nsec. In this case, the maximum access time is given by TB+TR+TB+TC+TB+TD+TB+TC+TB+TD+TB+TC+TB+TD+TB+TC+TB+TD=4.3 μsec.

Consequently, data transfer for the four colors delays with respect to the print speed. For this reason, the DMA operations for the four colors are consecutively performed.

In this case, the maximum access time is given by

TB+TR+TB+TC+TB+(TD+TD+TD+TD)=2.5 μsec.

That is, a margin can be ensured.

As described above, if the print speed is increased to improve the performance of the printer, the data transfer rate to the engine circuit 160 must also be increased. Consequently, the frequency of the signal DATACK must be increased. For this reason, the above arrangement of the DMA request circuit 1602 is indispensable for the above operation.

As described above, according to this embodiment, even if color print data must be transferred at high speed in a print operation using a line-type printhead, since the bitmap RAM can be consecutively accessed, the print data can be properly transferred.

This embodiment exemplifies a printer constituted by a formatter and an engine as separate units. Even if, however, the present invention is applied to an integrated printer, the same operation as that described above can be performed.

The engine in this embodiment is constituted by the two separate blocks. Even if, however, the engine is constituted by one block, the same operation as that described above can be performed.

In addition, this embodiment exemplifies a color printer using four printheads. However, the present invention is not limited to this. For example, as long as a printer to which the present invention is applied has two or more printheads, the same operation as that described above can be performed.

Furthermore, the constants in this embodiment, e.g., the number of data bits to be transferred and the time of a horizontal sync signal, are examples, but the present invention is not limited to these.

[Second Embodiment]

The second embodiment will be briefly described first. A printer of this embodiment uses devices identical to those described in the first embodiment as common devices. The characteristic constituent elements and their operations of the embodiment will be mainly described below.

This embodiment includes the same number of latch circuits as that of printheads ("four" in this case). Each latch circuit stores a data transfer start address (TOPA; this corresponds to the upper left end of an image on a printing paper) and a data transfer end address (ENDA; this corresponds to the lower right end of the image on the printing paper) of a bitmap RAM 115 to operate according to a double buffer control while performing a color print operation. When a print operation is started, a signal TOF1 as an absolute position detection signal indicating the leading end of printing paper becomes active. Start and end addresses (TOPA and ENDA) corresponding to the first print data are latched by K-latch circuits 720 and 721 (to be described later) in synchronism with this signal from the sensor 171a.

The printing paper is then conveyed, and a signal K-ENB* indicating the data transfer timing for the first printhead (K head) 190K becomes active. At this time, address data is transferred from the K-latch circuit 720 to an address generation circuit 728. At the same time, start and end addresses (TOPA and ENDA) corresponding to the second printhead (C head) 190C are latched by C-latch circuits 722 and 723.

The printing paper is then conveyed, and a signal C-ENB* indicating the data transfer timing for the second printhead (C head) 190C becomes active. At this time, address data from the C-latch circuit 722 is transferred to an address generation circuit 731. At the same time, start and end addresses (TOPA and ENDA) corresponding to the third printhead (M head) 190M are latched by M-latch circuits 724 and 725. Subsequently, a similar operation is repeated.

With this operation, when start and end addresses (TOPA and ENDA) change, one of the distance between the sensor 171a and the first printhead 190K or the distance between the heads, whichever is longer, becomes the minimum print length in the double buffer control. A proper print operation can therefore be performed as long as the length of printing paper is larger than the minimum print length.

The arrangement of an address block 1501 of an engine control unit 1404 of a formatter 110 will be described next.

Figure 12A:
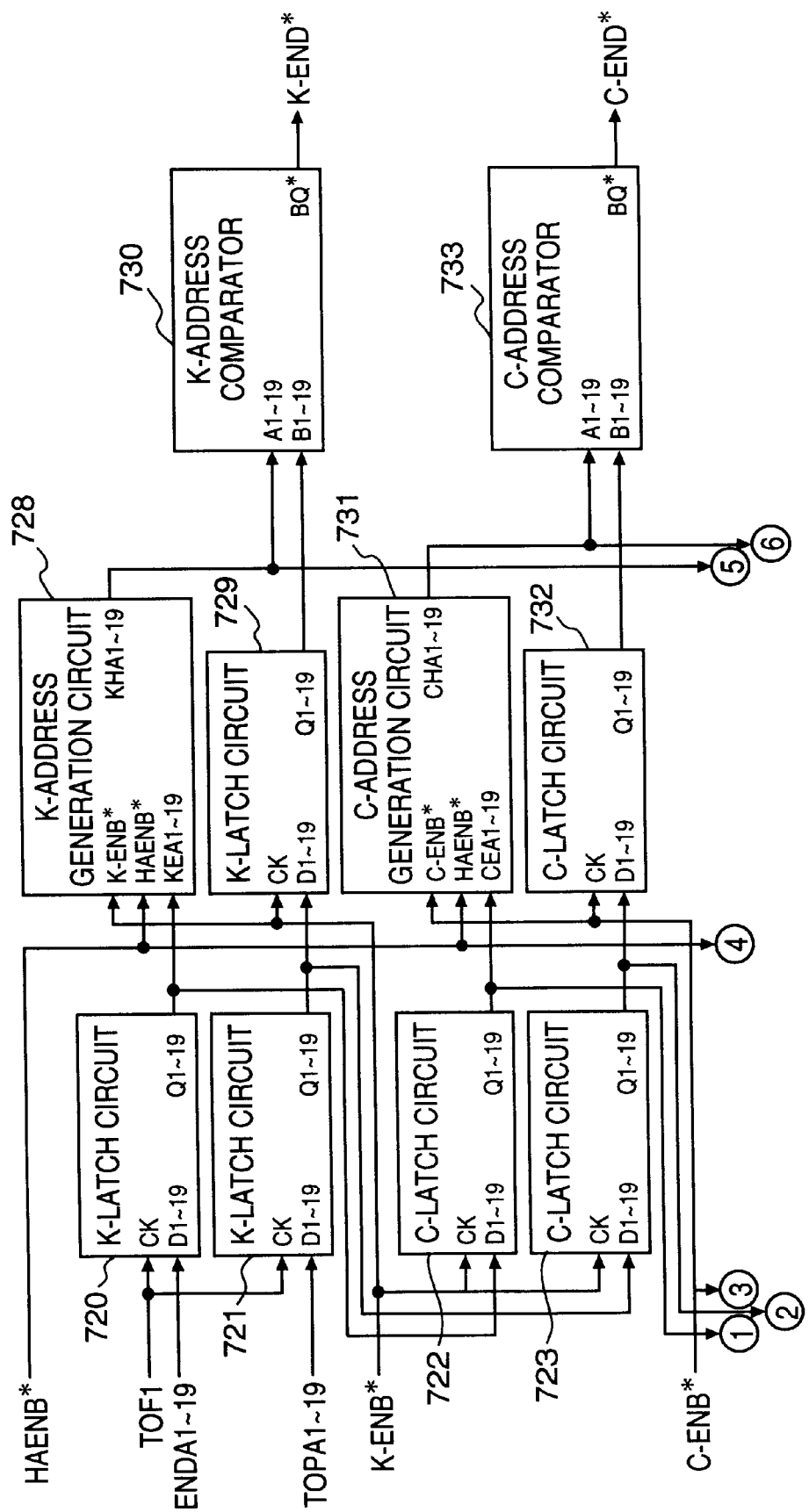
FIGS. 12A and 12B are block diagrams showing the arrangement of an address block 1501 of the engine control unit 1405.
Figure 12B:
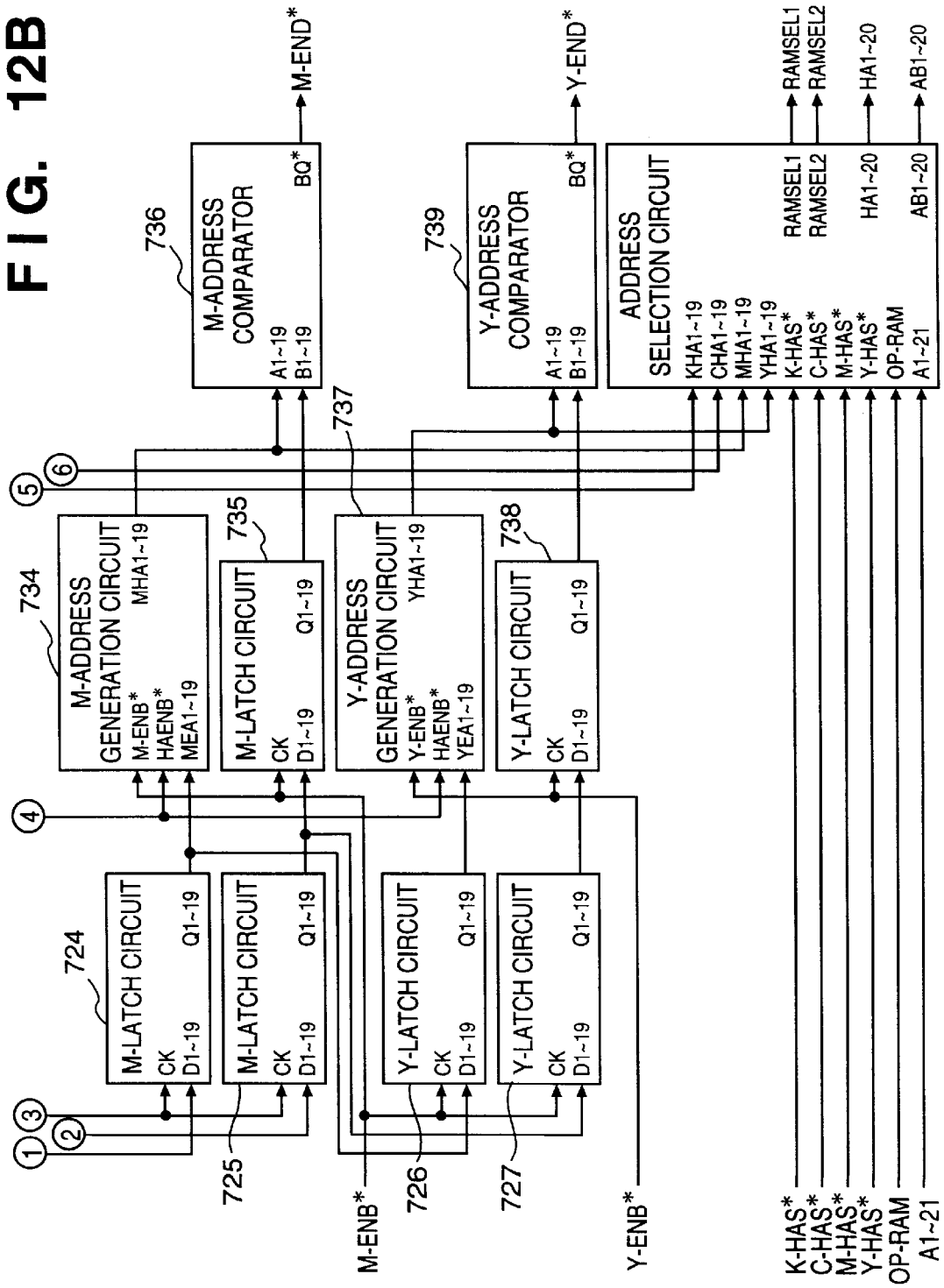

FIGS. 12A and 12B are circuit diagrams showing the arrangement of the address block 1501.

Referring to FIGS. 12A and 12B, the K-latch circuit 720 stores the end address (ENDA1 to ENDA19), which corresponds to the lower right end of an image on a printing paper, of black data in the bitmap RAM 115 which is set by a CPU-F 111, and the K-latch circuit 721 stores the start address (TOPA1 to TOPA19), which corresponds to the upper left end of the image on the printing paper, of the black data set by the CPU-F 111. Similarly, the C-latch circuit 722 stores the end address, which corresponds to the lower right end of the image on the printing paper, of cyan data, and the C-latch circuit 723 stores the start address, which corresponds to the upper left end of the image on the printing paper, of the cyan data. The M-latch circuits 724 and 725 and Y-latch circuits 726 and 727 perform the same operation as described above.

Reference numerals 728, 731, 734, and 737 denote a-address generation circuits for generating read addresses for the respective colors in the bitmap RAM 115. In this case, the symbol "a-" is used as a generic term indicating one of "K-", "C-", "M-", and "Y-". The symbol "a-" will be used below in the same manner. Reference numerals 729, 732, 735, and 738 denote a-latch circuits for storing the start addresses (TOPA1 to TOPA19) for the respective colors; and 730, 733, 736, and 739, a-address comparators for respectively comparing 19-bit read addresses output from the a-address generation circuits with the values held in the a-latch circuits 729, 732, 735, and 738. When these comparison results indicate coincidence, these a-address comparators output coincidence signals a-END* corresponding to the respective colors. Reference numeral 740 denotes an address selection circuit for sequentially outputting four addresses corresponding to the respective colors.

Reference symbols HA1 to HA20 denote addresses for accessing the bitmap RAM 115; and AB1 to AB20, addresses by the CPU-F 111 accesses the bitmap RAM 115. The addresses HA1 to HA20 are used to select addresses aHA1 to aHA19 input from the a-address generation circuits in accordance with signals a-HAS* input from a timing block 1500, and another upper bit is added to each selected address in correspondence with each color to output a 20-bit address.

The operation of each circuit in FIGS. 12A and 12B will be summarized below.

(1) a-address Generation Circuits 728, 731, 734, and 737

Each a-address generation circuit generates an address in the bitmap RAM 115 in which print data are stored in units of colors. Each a-address generation circuit receives signals HAENB* and a-ENB* generated by the timing block 1500 during a print operation, and calculates the logical product of these signals. The count value of the a-address generation circuit is then decremented one by one to generate a read address for print data of each color.

(2) a-address comparators 730, 733, 736, and 739

The a-address comparators compare output values (read addresses) from the a-address generation circuits with data (TOPA) from the a-latch circuits 729, 732, 735, and 738 to check whether or not they coincide with each other. If these address data coincide with each other, each signal a-END* becomes active to indicate that data transfer corresponding to one page for the corresponding color is completed.

(3) Address Selection Circuit 740

The address selection circuit 740 selects one of four address signals (KHA, CHA, MHA, YHA1 to YHA19) in accordance with the signal a-HAS* generated by the timing block 1500.

The relationship between the print data and addresses in the bitmap RAM 115 will be described below.

Figure 13:
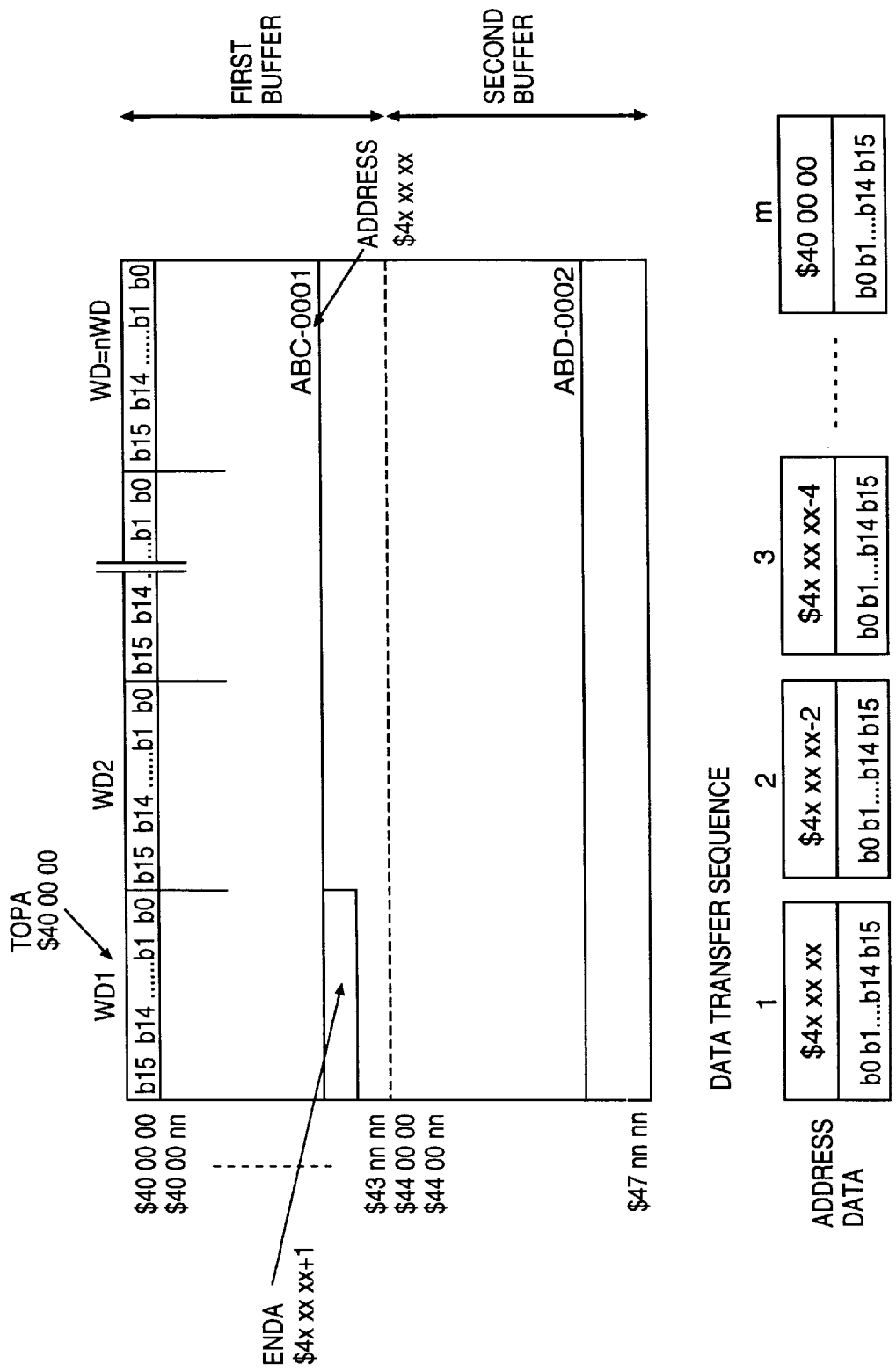
FIG. 13 is a diagram showing a data transfer sequence for a bitmap RAM 115.

FIG. 13 is a diagram showing a data transfer sequence in which data is read out from the bitmap RAM 115 and transferred.

In order to perform a print operation, a start address (TOPA) which corresponds to the upper left end of an image for one page and an end address (ENDA) which corresponds to the lower right end of the image for data transfer must be designated, together with a transfer data amount (word count: NWD).

A case wherein the end address is designated will be described first.

The printer of this embodiment is designed in a manner such that the lowermost line of printing paper is printed and output first. Thus, transfer of print data must be started from the address ($4xxxxx) of (ENDA-1) in FIG. 13. Subsequently, this end address is decremented by the a-address generation circuit one by one. When the output from this a-address generation circuit becomes equal to the start address (TOPA), a signal a-END* indicating the end of data transfer corresponding to one page is output from the a-address comparator. This signal a-END* is input to the timing block 1500, and the signal Aa-ENB* is rendered inactive (high level) at this timing.

In general, in constituting the bitmap RAM 115, not the design in which totally different addresses are assigned for each color data but the design in which only the upper bits of the addresses in the bitmap RAM 115 are changed and the lower bits are kept unchanged, is desirable for the sake of simplifying the bit addressing of the memory. The lower common addresses (A1 to A19) in the bitmap RAM 115 are set as the start addresses (TOPA) respectively set in the latch circuits 720, 722, 724, and 726 and the end addresses (ENDA) respectively set in the latch circuits 721, 723, 725, and 727.

In addition, the printer of this embodiment employs a double buffer control. In this double buffer control, for the first page, the contents of the first buffer (corresponding to, e.g., addresses $400000 to 43FFFF, when black data is stored at addresses $400000 to 4FFFFF; $ indicates a hexadecimal number) are transferred as print data, and for the second page, the contents of the second buffer (corresponding to addresses $440000 to 47FFFF in the case of the above black data) are transferred as print data. For the third page, data is transferred from the first buffer, and for the fourth page, data is transferred from the second buffer, and so on. In this manner, data are alternately transferred from the first and second buffers. This method is characterized in that the CPU-F 111 can rewrite the contents of the second buffer while the contents of the first buffer are transferred. Therefore, the contents to be printed can be changed for each page to greatly increase the value added as the printer.

In order to realize this function, the CPU-F 111 must rewrite the contents of the bitmap RAM 115 during a print operation, and must also rewrite the contents of the TOPA and ENDA registers of a GAF 116 upon this rewriting operation. In addition, the CPU-F 111 performs page management on the basis of the signal output from the sensor 171a.

As shown in FIG. 6, TOPA and ENDA are latched when the signal from the sensor 171a becomes active. That is, this operation is performed by the K-latch circuits 720 and 721 of the GAF 116 shown in FIGS. 12A and 12B. Thereafter, the GAF 116 makes the signal K-ENB* active so as to latch ENDA and TOPA in the K-address generation circuit 728 and the K-latch circuit 729 respectively. When the signal K-ENB* becomes active, TOPA and ENDA are respectively latched in the C-latch circuits 722 and 723. With this operation, the K-latch circuits 720 and 721 become free from the read operation of the bitmap RAM 115, and the contents of the respective circuits are rewritten when the values of TOPA and ENDA are input at the timing of the next signal from the sensor 171a.

When the signal C-ENB* becomes active, the contents of the C-latch circuit 722 are latched in the address generation circuit 731 and the M-latch circuit 724. Furthermore, the contents of the C-latch circuit 723 are latched in the C-latch circuit 732 and the M-latch circuit 725. With this operation, cyan data are sequentially read out from the bitmap RAM 115 from ENDA to TOPA. When a signal M-ENB becomes active, the contents of the M-latch circuit 724 are latched in the M-address generation circuit 734 and an Y-latch circuit 726, and the contents of the M-latch circuit 725 are latched in the M-latch circuit 735 and the Y-latch circuit 727. When a signal Y-ENB* becomes active, the contents of the Y-latch circuit 726 are latched in the Y-address generation circuit 737, and the contents of the Y-latch circuit 727 are latched in the Y-latch circuit 738.

Note that, in the bitmap RAM 115, the black (K) data is stored at addresses $400000 to $4FFFFF; the cyan data, at addresses $500000 to 5FFFFF; the magenta data, at addresses $600000 to 6FFFFF; and the yellow data, at addresses $700000 to 7FFFFF.

With the above operation, a double buffer operation can be properly performed with respect to printing paper having a length equal to or longer than one of the distance from the sensor 171a and the first printhead (K head) 190K or the distance between the printheads, whichever is longer. If a print operation is performed without this double buffer control operation, the minimum length of one page which can be printed becomes the distance from the sensor 171a to the last printhead (Y head) 190Y. Below this value, addresses in the bitmap RAM 115 shift for the respective colors, and a double buffer operation is not possible.

After the values of TOPA and ENDA for the respective colors are latched in this manner, the a-address generation circuits 728, 731, 734, and 737 respectively output addresses in the bitmap RAM 115 on the basis of the signal HAENB* transferred from the timing block 1500, thereby reading out print data from the bitmap RAM 115.

The above operation is the basic double buffer control operation. When this method is actually applied to the printer, the bitmap RAM 115 needs to have a storage capacity corresponding to three pages of the recording medium.

Figure 14:
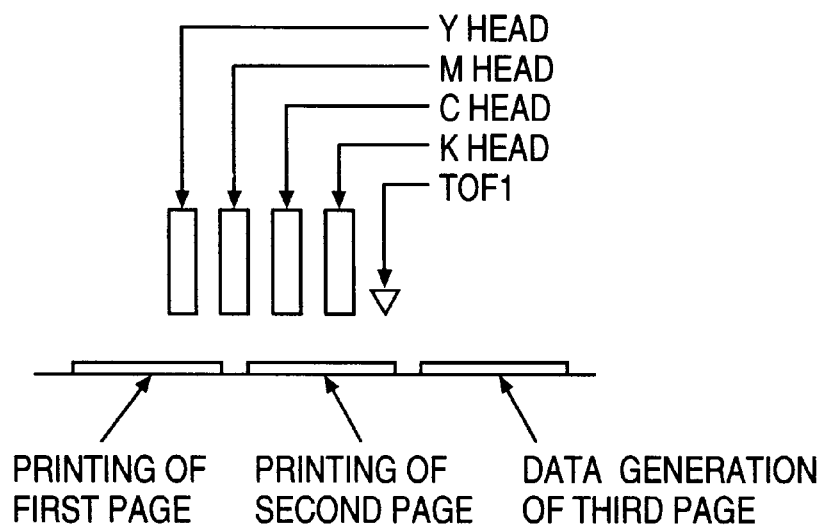
FIG. 14 is a diagram showing the positional relationship between printheads of the respective colors and printing paper in a printing operation according to a double buffer control.

FIG. 14 shows a print operation based on double buffer control.

Since a color printer needs printheads for four colors (K, C, M, and Y), there are gaps between the respective printheads. This inter-head gap may correspond to data for two pages, depending on the size of printing paper. For this reason, a buffer for data for two pages during data transfer, and another buffer for data for one page for preparing the next print operation are required. Thus, a bitmap RAM 115 having a storage capacity corresponding to three pages of the recording papers is required. As the printing paper decreases in length, the capacity of the bitmap RAM 115 must correspond to four and five pages. In this case, however, since the required storage of the bitmap RAM 115 per page also decreases, a total capacity of memories does not increase.

Taking the above into consideration, in order to smoothly perform a print operation by the above double buffer control, the bitmap RAM 115 must have a storage capacity corresponding to (the distance between the sensor 171a and the last printhead (Y head) 190Y)×3 or more.

As described above, according to this embodiment, in the color printer using the line-type printheads, a print operation can be efficiently performed by employing the double buffer control with respect to a printing paper having a length equal to or more than one of the distance between the leading end (sensor 171a) of the printing paper and the first printhead or the distance between the respective heads, whichever is longer.

[Third Embodiment]

A printer of this embodiment uses an apparatus identical to those described in the first embodiment as a common apparatus. The characteristic constituent elements and their operations of the embodiment will be mainly described below.

In general, in a page printer, since a bitmap RAM 115 requires a large capacity, the production cost is closely related to the capacity of the bitmap RAM. The bitmap RAM 115 may have a small capacity depending on the use of the printer. If, for example, the printer is used to print an image on a small label or print a large amount of image data of the same contents (e.g., the same image data is to be printed on name cards or the like) without requiring the above double buffer control, the bitmap RAM 115 having a small capacity can be used.

On the other hand, when the printer is used to print an image on a large label or print a relatively large sized management label, bar codes or serial numbers sometimes need to be printed. In addition, if double buffer control is employed, the bitmap RAM 115 must have a large capacity.

As described above, the required capacity of the bitmap RAM 115 varies depending on the type of print data to be printed by the printer and the size of a printing medium. Since the RAM itself is expensive, a circuit arrangement capable of selecting the capacity of the bitmap RAM 115 is preferable in terms of cost.

Under the above circumstances, consider a case wherein the capacity of a RAM to be implemented in the printer can be flexibly changed depending on the use of the printer. Assume that the bitmap RAM 115 is constituted by a plurality of 16M-bit DRAMs (1M word×16 bits), and a mode of using one DRAM for the respective color data and another mode of using two DRAMs for the respective color data can be switched.

Figure 15:
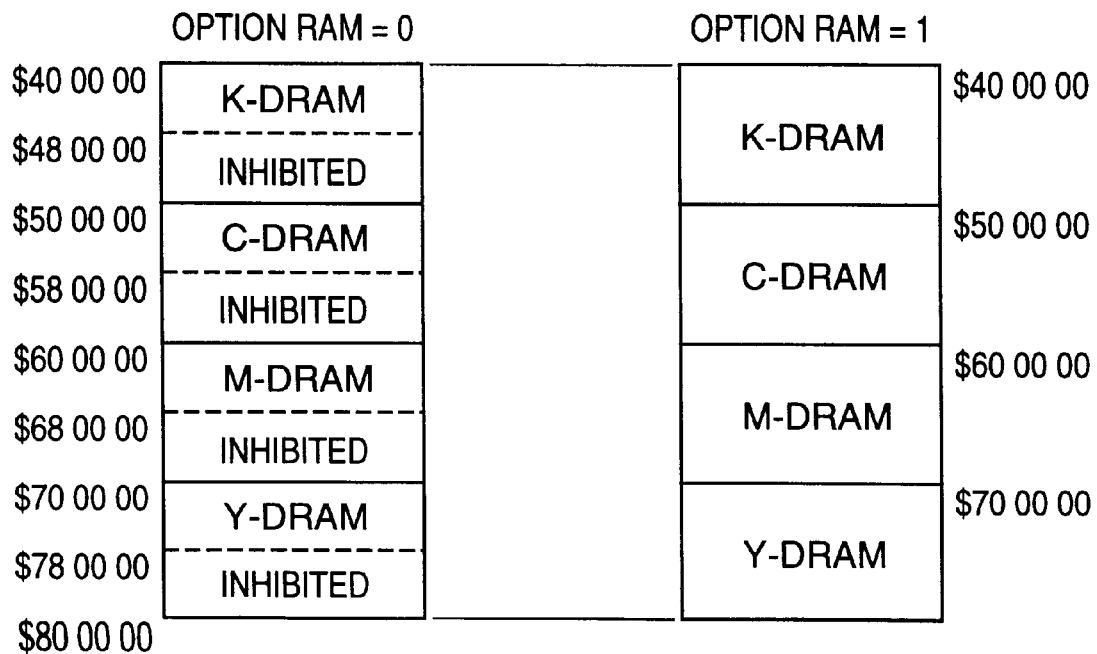
FIG. 15 is a memory map of a bitmap RAM 115.

FIG. 15 shows a memory map of the bitmap RAM 115. When an option RAM signal is =0, it indicates a state wherein an option RAM is not implemented. When the optional RAM signal=1, it indicates a state wherein the option RAM is implemented, and the overall bitmap memory space can be accessed by consecutive addresses. Note that this option RAM signal is supplied from a CPU-F 111. Whether this option RAM is implemented or not may be automatically checked by accessing a predetermined memory address in the bitmap RAM 115, or may be designated by the operator using an operation panel 121.

A 16M-bit DRAM requires 20 address signal lines on the CPU-F 111 side. Of these signals, the upper two signal lines are used for color separation address signals. More specifically, signal lines A21 and A20 are used as color separation address signal lines.

As described above, in this embodiment, an address of each color data is fixed such that the absolute address for accessing the respective color data does not change for each color regardless of whether one DRAM or two DRAMs are used per color. More specifically, the upper bits of each address are used as a color separation address signal line, and the address constituted by the lower bits remains the same with respect to the change of color. With this arrangement, since image data of the respective colors can be accessed by the same address in terms of the logical address space managed by software, the program can be simplified.

Referring to FIG. 15, the bitmap RAM 115 is assigned to addresses from $400000 to $7FFFFF. More specifically, A21=0 and A20=0 correspond to the K-DRAM (black data); A21=0 and A20=1, the C-DRAM (cyan data); A21=1 and A20=0, the M-DRAM (magenta data); and A21=1 and A20=1, the Y-DRAM (yellow data). In this case, since at least one DRAM is required for each color, the mode of using one DRAM is regarded as a standard mode, and the addresses corresponding to the inhibition areas in FIG. 15 are addresses set when the optional DRAM is implemented.

As is apparent from FIG. 15, when one DRAM is used (in the standard mode), consecutive addresses are not set. However, since one DRAM is actually used, the addresses are consecutive in terms of an IC as a unit. For this reason, the addresses in a GAF 116 must be controlled such that the apparent addresses are consecutive. This control will be described next.

First of all, the capacity of the bitmap RAM 115 is detected by a control program executed by the CPU-F 111. In performing this detection, for example, data is read/written at/from address $7FFFFF. If this read/write operation is properly performed, the presence of the optional DRAM is discriminated, and vice versa. If the optional DRAM is not present, the CPU-F 111 writes "0" in a register (to be referred to as an optional RAM register), integrated in the GAF 116, which is used for determining the presence/absence of the option RAM. With this operation, the option RAM signal is set at low level.

Figure 16:
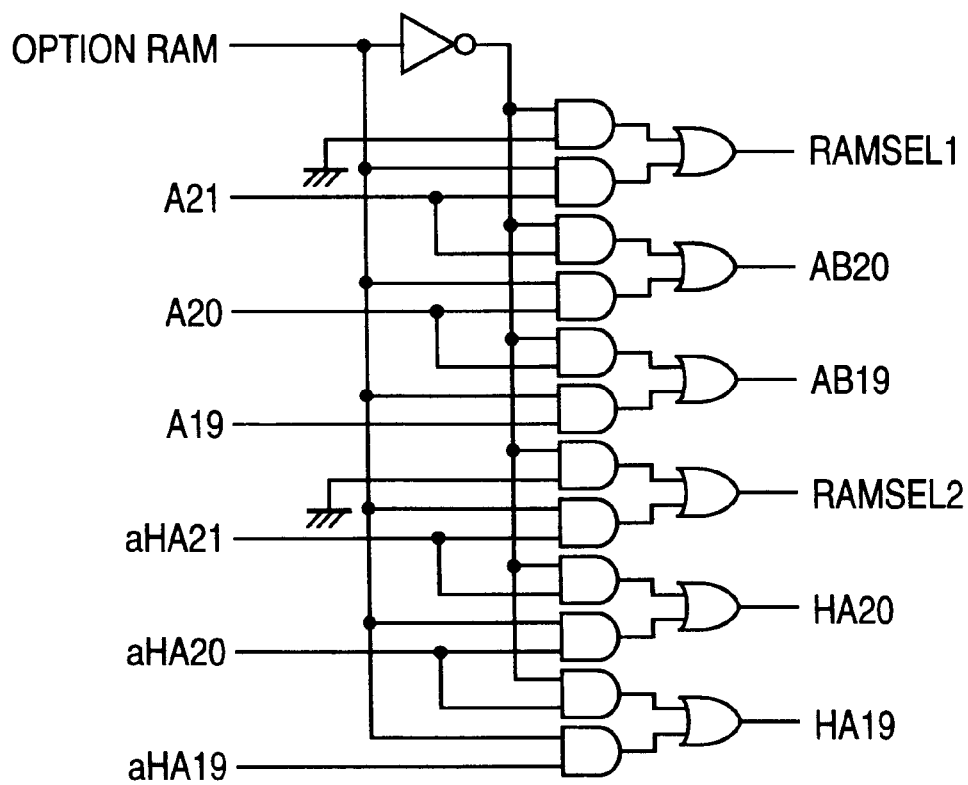
FIG. 16 is a circuit diagram showing the arrangement of a portion of an address selection circuit of the address block 1501.

FIG. 16 is a circuit diagram showing the arrangement of an address switching circuit of an address selection circuit 740.

As is apparent from FIG. 16, the addresses set when the option RAM is not implemented (option RAM=0) are switched as follows:

GND→RAMSEL1 GND→RAMSEL2

A21→AB20 aHA21→HA20

A20→AB19 aHA20→HA19

A19→NO CONNECTION aHA19→NO CONNECTION

With this operation, the addresses are translated as follows:

CPU-F 111 address  DRAM address $400000→$00000

$500000→$10000

$600000→$20000

$700000→$30000

Although the addresses viewed from the CPU-F 111 are not consecutive, the addresses in the DRAM are consecutive. Thus, even with one DRAM, it is considered that the bitmap RAM is present at the addresses set in the memory map, and a proper access operation can be performed. The same operation is performed with respect to signals aHA19 to aHA21 as DMA address signals generated by the ADRS block. In this case, the RAMSEL signal is set to "0". With this signal, a DRAM control signal is output to only the DRAM implemented as a standard unit. With this operation, even if one DRAM is used, addresses matching the memory map can be output.

When the optional DRAM is present (option RAM signal=1), the CPU-F 111 writes "1" in the optional DRAM register of the GAF 116. With this operation, the option RAM signal=1.

In this case, the GAF 116 performs no address translation in the DMA address generation circuit. In addition, the value of A21 is replaced by the signal RAMSEL1. With this operation, when A21 is "0", the signal RAMSEL1 is set to "0", and a DRAM control signal is output to the standard DRAM. When A21 is "1", the signal RAMSEL1 is set to "1", and a DRAM control signal is also output to the optional DRAM. The same operation is performed with respect to an address signal generated in DMA transfer.

With the above operation, it is automatically discriminated whether one DRAM or two DRAMs are used in the bitmap RAM 115. In accordance with this discrimination result, the memory access modes can be switched.

As has been described above, according to this embodiment, a bitmap memory having a small capacity is used for a printer designed to print an image on a small label or card, whereas a bitmap memory having a large capacity is used for a printer designed to print an image on a large label or perform a print operation based on double buffer control. In this manner, the capacity of the bitmap memory can be changed in accordance with the use of the printer, thereby allowing standardization of a circuit and resulting in a reduction in cost.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of a so-called on-demand type or continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices, or to an apparatus comprising a single device. Furthermore, it goes without saying that the invention is also applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printer for receiving print data from an external device and printing an image on a recording medium by using a plurality of printheads, comprising:

storage means for storing the print data in units of colors;

print means for receiving the print data and outputting the print data to said plurality of printheads to print the image on the recording medium;

read means for consecutively reading out the print data corresponding to each of said plurality of printheads from said storage means by a predetermined amount using a direct memory access method when a read operation for the print data stored in said storage means is designated by said print means; and access means for refreshing or accessing said storage means after the read operation is completed by said read means, wherein the predetermined amount is a data amount which corresponds to each of said plurality of printheads, and a period of time required for consecutively reading out the data amount ensures a refresh interval required by said storage means.

2. The printer according to claim 1, further comprising arbitrating means for receiving at least a transfer request for print image to said printhead, a refresh request for said storage means, and an access request for said storage means, giving priorities to the requests, and activating said access means upon sequentially accepting the requests according to the priorities.

3. The printer according to claim 2, wherein said arbitrating means accepts the refresh request with the highest priority.

4. The printer according to claim 1, wherein each of said plurality of printheads is a color printhead for printing a print image corresponding to each color.

5. The printer according to claim 1, wherein the print data read out from said storage means by said print means is output in synchronism with movement of the recording medium by one line.

6. The printer according to claim 1, wherein each of said plurality of printheads is an ink-jet printhead for performing a print operation by discharging an ink.

7. The printer according to claim 6, wherein each of said plurality of printheads is a printhead for discharging an ink by using heat energy and includes a transducer for generating heat energy to be applied to the ink.

8. A printer for receiving print data from an external device and printing an image on a recording medium by using a plurality of printheads, comprising:

storage means for storing the print data in correspondence with said plurality of printheads;

print means for receiving the print data from said storage means and printing the image on the recording medium by outputting the print data to said plurality of printheads;

address storage means for storing read start and end addresses of each of the print data stored in correspondence with said plurality of printheads; and transfer means for reading out the print data from addresses, in said storage means, which are between the read start and end addresses stored in said address storage means, and transferring the print data to said corresponding printheads, wherein the print data corresponding to said plurality of printheads are stored at different addresses in said storage means, and a plurality of lower bits of the addresses are the same.

9. The printer according to claim 8, wherein said plurality of printheads are color printheads for printing images in different colors.

10. The printer according to claim 8, further comprising a sensor for detecting a leading end of the recording medium, wherein said address storage means stores read start and end addresses of print data for one of said plurality of printheads in synchronism with a signal from the sensor, and sets the read start and end addresses as read start and end addresses of print data for one of the rest of said plurality of printheads in synchronism with a print timing of each of said plurality of printheads.

11. The printer according to claim 8, wherein each of said plurality of printheads is a color printhead for printing a print image corresponding to each color.

12. The printer according to claim 8, wherein each of said plurality of printheads is an ink-jet printhead for performing a print operation by discharging an ink.

13. The printer according to claim 12, wherein each of said plurality of printheads is a printhead for discharging an ink by using heat energy and includes a transducer for generating heat energy to be applied to the ink.

14. A printer for receiving print data from an external device and printing an image on a recording medium by using a plurality of printheads, comprising:

storage means for storing the print data in correspondence with said plurality of printheads;

print means for receiving the print data from said storage means and printing the image on the recording medium by outputting the print data to said plurality of printheads;

signal generation means for generating an optional memory signal indicating that an optional memory is added to said storage means; and address changing means for changing an address for accessing said storage means in accordance with the optional memory signal, wherein said address changing means includes:

a first circuit separating a read address signal for said storage means from an address signal from a main control circuit for controlling said storage means, shifting the address signal from the main control circuit, and outputting the shifted signal as an address signal for said storage means, and a second circuit shifting a part of an address signal for reading out the print data from said storage means, and outputting the shifted signal as an address signal for said storage means.

15. The printer according to claim 14, wherein the optional memory is added to an address area corresponding to each of said plurality of printheads.

16. The printer according to claim 14, wherein when said optional memory is added, a memory address space of said storage means becomes a continuous address space.

17. The printer according to claim 14, wherein each of said plurality of printheads is a color printhead for printing a print image corresponding to each color.

18. The printer according to claim 14, wherein each of said plurality of printheads is an ink-jet printhead for performing a print operation by discharging an ink.

19. The printer according to claim 18, wherein each of said plurality of printheads is a printhead for discharging an ink by using heat energy and includes a transducer for generating heat energy to be applied to the ink.

20. A printer for receiving print data from an external device and printing an image on a recording medium by using a plurality of printheads, comprising:

storage means for storing the print data in correspondence with said plurality of printheads;

print means for receiving the print data from said storage means and printing the image on the recording medium by outputting the print data to said plurality of printheads;

signal generation means for generating an optional memory signal indicating that an optional memory is added to said storage means; and address changing means for changing an address for accessing said storage means in accordance with the optional memory signal, wherein the memory areas, in said storage means, which correspond to said plurality of printheads are set such that absolute values of the addresses of the print data become the same.

21. The printer according to claim 20, wherein the optional memory is added to an address area corresponding to each of said plurality of printheads.

22. The printer according to claim 20, wherein when said optional memory is added, a memory address space of said storage means becomes a continuous address space.

23. The printer according to claim 20, wherein each of said plurality of printheads is a color printhead for printing a print image corresponding to each color.

24. The printer according to claim 20, wherein each of said plurality of printheads is an ink-jet printhead for performing a print operation by discharging an ink.

25. The printer according to claim 24, wherein each of said plurality of printheads is a printhead for discharging an ink by using heat energy and includes a transducer for generating heat energy to be applied to the ink.

26. A data processing method applied to a printer including print means for receiving print data from an external device and printing an image on a recording medium by using a plurality of printheads, comprising the steps of:

storing the print data in correspondence with the plurality of printheads into a memory;

consecutively reading out the print data corresponding to each of the plurality of printheads from the memory by a predetermined amount using a direct memory access method when a read operation for the print data stored in the memory is designated by the print means;

printing the image on the recording medium by receiving the print data and outputting the print data to the plurality of printheads; and refreshing or accessing the memory after the read operation is completed in said reading step, wherein the predetermined amount is a data amount which corresponds to each of the plurality of printheads, and a period of time required for consecutively reading out the data amount ensures a refresh interval required by the memory.

27. The method according to claim 26, further comprising the step of receiving at least a transfer request for print image to the printhead, a refresh request for the memory, and an access request for the memory, giving priorities to the requests, and activating said refreshing or accessing step upon sequentially accepting the requests according to the priorities.

28. The method according to claim 27, wherein said receiving step accepts the refresh request with the highest priority.

29. A data processing method applied to a printer for receiving print data from an external device and printing an image on a recording medium by using a plurality of printheads, comprising the steps of:

storing the print data in correspondence with the plurality of printheads into a first memory;

storing read start and end addresses of each of the print data in correspondence with the plurality of printheads stored in the first memory, into a second memory;

reading out the print data from addresses, in the first memory, which are between the read start and end addresses stored in the second memory, and transferring the print data to the corresponding printheads; and printing the image on the recording medium by receiving the print data from the first memory and outputting the print data to the plurality of printheads, wherein the print data corresponding to the plurality of printheads are stored at different addresses in the first memory, and a plurality of lower bits of the addresses are the same.

30. The method according to claim 29, wherein said step of storing read start and end addresses of print data for one of the plurality of printheads into the second memory is in synchronism with a signal from a sensor for detecting a leading end of the recording medium, and the read start and end addresses are set as read start and end addresses of print data for one of the rest of the plurality of printheads in synchronism with a print timing of each of the plurality of printheads.

31. A data processing method applied to a printer for receiving print data from an external device and printing an image on a recording medium by using a plurality of printheads, comprising the steps of:

storing the print data in correspondence with the plurality of printheads into a memory;

generating an optional memory signal indicating that an optional memory is added to the memory if the optional memory is added;

changing an address for accessing the memory in accordance with the optional memory signal; and printing the image on the recording medium by receiving the print data from the memory and outputting the print data to the plurality of printheads, wherein said changing step includes the steps of:

(1) separating a read address signal for the memory from an address signal from a main control circuit for controlling the memory, shifting the address signal from the main control circuit, and outputting the shifted signal as an address signal for the memory; and (2) shifting a part of an address signal for reading out the print data from the memory, and outputting the shifted signal as an address signal for the memory.

32. The method according to claim 31, wherein when the optional memory is added, a memory address space of the memory becomes a continuous address space.

33. A data processing method applied to a printer for receiving print data from an external device and printing an image on a recording medium by using a plurality of printheads, comprising the steps of:

storing the print data in correspondence with the plurality of printheads into a memory;

generating an optional memory signal indicating that an optional memory is added to the memory if the optional memory is added;

changing an address for accessing the memory in accordance with the optional memory signal;

printing the image on the recording medium by receiving the print data from the memory and outputting the print data to the plurality of printheads;

wherein the memory areas, of the memory, which correspond to the plurality of printheads are set such that absolute values of the addresses of the print data become the same.

34. The method according to claim 33, wherein when the optional memory is added, a memory address space of the memory becomes a continuous address space.

35. A printing apparatus having a plurality of printheads, each arraying a plurality of printing elements and printing in a different color on a recording medium, comprising:

a memory, having a plurality of areas corresponding to color components of print data, for storing the color components of the print data in the respective areas;

control means for controlling an access operation to said memory from an external circuit, and controlling a refresh operation on said memory; and read means for reading out the print data, corresponding to each of the plurality of printheads, stored in said memory by a predetermined amount, wherein, when reading out the print data with said read means, each time the predetermined amount of the print data corresponding to each of said plurality of printheads is read out, said control means enables the access operation to said memory and the refresh operation on said memory.

36. The apparatus according to claim 35, wherein when the access operation to said memory conflicts with the refresh operation on said memory, said control means gives priority to the refresh operation.

37. The apparatus according to claim 35, wherein the print data read out from said memory upon a print operation is output in synchronism with movement of the recording medium by one line.

38. The apparatus according to claim 35, wherein each of the plurality of printheads comprises an ink-jet printhead for performing a print operation by discharging ink.

39. The apparatus according to claim 38, wherein each ink-jet printhead includes an electrothermal transducer for generating heat energy to be applied to the ink so as to discharge the ink by using the generated heat energy.

40. A printing apparatus for printing on a recording medium by using a plurality of printheads, each arraying a plurality of printing elements in an arraying direction, comprising:

mounting means for mounting the plurality of printheads along a direction different from the arraying direction of the plurality of printing elements;

a memory, having a plurality of areas corresponding to the plurality of printheads, for storing print data corresponding to the plurality of printheads in the respective areas;

conveyance means for conveying the recording medium in the direction in which the plurality of printheads are mounted;

storage means for storing information indicating each of the plurality of areas in said memory; and control means for updating the information stored in said storage means based on a signal indicating a start for transferring the print data corresponding to each of the plurality of printheads, wherein, in correspondence with a signal indicating a start for transferring print data to a predetermined one of the plurality of printheads, said control means updates information indicating areas in which print data corresponding to the rest of the plurality of printheads are stored.

41. The apparatus according to claim 40, wherein the information comprises addresses at which the print data corresponding to the plurality of printheads is stored in said memory.

42. The apparatus according to claim 41, further comprising a sensor for detecting a leading end of the recording medium, wherein said storage means stores read start and end addresses of print data for one of the plurality of printheads in synchronism with a signal from the sensor, and sets the read start and end addresses as read start and end addresses of print data for one of the rest of the plurality of printheads in synchronism with a print timing of each of the plurality of printheads.

43. The apparatus according to claim 40, wherein the plurality of printheads comprise color printheads for printing images in different colors.

44. The apparatus according to claim 40, wherein each of the plurality of printheads comprises an ink-jet printhead for performing a print operation by discharging ink.

45. The apparatus according to claim 44, wherein each ink-jet printhead includes an electrothermal transducer for generating heat energy to be applied to the ink so as to discharge the ink by using the generated heat energy.

46. A printing apparatus for printing on a recording medium by using a plurality of printheads, comprising:

a memory, having a plurality of areas corresponding to the plurality of printheads, for storing print data corresponding to the plurality of printheads in the respective areas;

a slot to which an optional memory is attached;

an address output circuit for outputting an address to access said memory and the optional memory; and address change means for changing an address used for accessing said memory and the optional memory such that an absolute address is not changed regardless of whether or not the optional memory is attached to said slot.

47. The apparatus according to claim 46, wherein the optional memory is added to an address area corresponding to each of the plurality of printheads.

48. The apparatus according to claim 46, wherein when the optional memory is added, a memory address space of said memory and the optional memory becomes a continuous address space.

49. The apparatus according to claim 46, wherein the plurality of areas in said memory, which correspond to the plurality of printheads, are set such that absolute values of the addresses of the print data become the same.

50. The apparatus according to claim 46, wherein the plurality of printheads comprise color printheads for printing images in different colors.

51. The apparatus according to claim 46, wherein each of the plurality of printheads comprises an ink-jet printhead for performing a print operation by discharging ink.

52. The apparatus according to claim 51, wherein each ink-jet printhead includes an electrothermal transducer for generating heat energy to be applied to the ink so as to discharge the ink by using the generated heat energy.

* * * * *